US008629860B2

(12) United States Patent
Omoto

(10) Patent No.: US 8,629,860 B2
(45) Date of Patent: Jan. 14, 2014

(54) DISPLAY DEVICE, DRIVING METHOD OF DISPLAY DEVICE AND ELECTRONIC APPARATUS

(75) Inventor: Keisuke Omoto, Kanagawa (JP)

(73) Assignee: Sony Corporation, Tokyo (JP)

( * ) Notice: Subject to any disclaimer, the term of this patent is extended or adjusted under 35 U.S.C. 154(b) by 331 days.

(21) Appl. No.: 13/029,444

(22) Filed: Feb. 17, 2011

(65) Prior Publication Data

US 2011/0221713 A1 Sep. 15, 2011

(30) Foreign Application Priority Data

Mar. 10, 2010 (JP) ................................ 2010-052729

(51) Int. Cl.
*G06F 3/038* (2013.01)
*G09G 5/00* (2006.01)

(52) U.S. Cl.
USPC .......................................................... 345/204

(58) Field of Classification Search
None
See application file for complete search history.

(56) References Cited

U.S. PATENT DOCUMENTS

2008/0024413 A1* 1/2008 Minami et al. .................. 345/90
2008/0180356 A1* 7/2008 Minami et al. .................. 345/55
2008/0231560 A1* 9/2008 Yamashita et al. .............. 345/76
2008/0252626 A1* 10/2008 Iida et al. ....................... 345/204
2009/0121974 A1* 5/2009 Yamashita et al. .............. 345/55
2009/0122046 A1* 5/2009 Minami ........................ 345/211
2009/0201233 A1* 8/2009 Yamashita et al. .............. 345/80
2010/0007583 A1* 1/2010 Handa et al. .................... 345/55
2010/0259532 A1* 10/2010 Tatara et al. .................. 345/213
2010/0309186 A1* 12/2010 Minami et al. ................ 345/211

FOREIGN PATENT DOCUMENTS

JP 2008-310127 12/2008

* cited by examiner

*Primary Examiner* — James Wozniak
*Assistant Examiner* — Antonio Xavier
(74) *Attorney, Agent, or Firm* — Dentons US LLP

(57) ABSTRACT

A display device includes: a pixel array unit in which plural pixels are arranged, each including an electro-optic device, a write transistor writing a video signal, a storage capacitor storing the video signal written by the write transistor and a drive transistor driving the electro-optic device based on the video signal stored in the storage capacitor, which have a function of correcting mobility of the drive transistors; and a scanning circuit giving a write scanning signal to gate electrodes of the write transistors while sequentially scanning respective pixels in the pixel array row by row as well as generating the write scanning signal based on respective timings of rising and falling of one pulse-state power source potential.

8 Claims, 20 Drawing Sheets

BEFORE $t=t_{11}$ $t=t_{11}$ $t=t_{12}$ $t=t_{13}$

WITHOUT THRESHOLD CORRECTION, WITHOUT MOBILITY CORRECTION

WITH THRESHOLD CORRECTION, WITHOUT MOBILITY CORRECTION

WITH THRESHOLD CORRECTION, WITH MOBILITY CORRECTION 142
141

142
143
141

141
147
143
145
146

141
142

141
142

141
142

144

DISPLAY DEVICE, DRIVING METHOD OF DISPLAY DEVICE AND ELECTRONIC APPARATUS

BACKGROUND OF THE INVENTION

1. Field of the Invention

The present invention relates to a display device, a driving method of the display device and an electronic apparatus, and particularly relates to a planar-type display device in which pixels each having an electro-optic device are arranged two-dimensionally in a matrix state, a driving method of the display device and an electronic apparatus having the display device.

2. Description of the Related Art

In recent years, in a field of display devices performing image display, a planar-type (flat-panel type) display device in which pixels (pixel circuits) are arranged in a matrix state is becoming popular rapidly. As one of the planer-type display devices, there is a display device using a so-called current-driven type electro-optic device as a light-emitting device of the pixel, in which light emission luminance varies according to a current value flowing in the device. As the current-driven type electro-optic device, an organic EL device is known, which uses electroluminescence (EL) as an organic material and utilizes a phenomenon of emitting light when an electric field is applied to an organic thin film.

An organic EL display device using the organic EL device as the light-emitting device of the pixel has the following characteristics. That is, the organic EL device is a low-power consumption device as the device can be driven by application voltage of 10V or less. The organic EL device has high visibility of images as compared with a liquid crystal display device because the device is a self luminous device, and further, the device can be light and thin because a lighting member such as a backlight is not necessary. Moreover, the organic EL device has extremely high response speed of approximately several μsec, therefore, residual images do not occur.

The organic EL display device can apply a simple (passive) matrix type and an active matrix type as a driving method thereof in the same manner as the liquid crystal display device. Though the simple matrix display device has a simple structure, a light emission period of the electro-optic device is reduced by the increase of scanning lines (namely, the number of pixels), therefore, there is a problem such that it is difficult to realize a large-sized and high definition display device.

In response to the above, the active matrix display device controlling electric current flowing in the electro-optic device by an active device which is, for example, an insulating-gate field-effect transistor provided in the same pixel where the electro-optic device is provided is under vigorous development in recent years. As the insulating-gate field-effect transistor, a TFT (Thin Film Transistor) is commonly used. In the active matrix display device, the electro-optic device maintains light emission during a period of one display frame, therefore, the large-sized high definition display device can be easily realized.

A pixel circuit having the current-driven type electro-optic device which is driven in the active matrix method includes the electro-optic device as well as a drive circuit for driving the electro-optic device. The pixel circuit having the drive circuit including a drive transistor 22, a write transistor 23 and a storage capacitor 24 is known, which drives an organic EL device 21 as the current-driven type electro-optic device (for example, refer to JP-A-2008-310127 (Patent Document 1).

In Patent Document 1, it is disclosed that a scanning line potential (write scanning signal) WS is allowed to fall at the falling timing of a power supply voltage Vdd2 by using the power supply voltage Vdd2 which falls immediately in a pulse state (refer to Paragraph No. 0116 and so on in Patent Document 1). It is also disclosed in Patent Document 1 that a threshold correction period is defined by the rising timing of a power supply line potential DS and the falling timing of the scanning line potential WS (refer to Paragraph No. 0117 and so on in Patent Document 1).

Also in Patent Document 1, it is further disclosed that writing of a video signal is performed when the write scanning signal WS is in an active state (refer to Paragraph No. 0062 and so on in Patent Document 1). It is further disclosed in Patent Document 1 that mobility correction which corrects variations in mobility of transistors in respective pixels is performed in parallel to the writing of the video signal (refer to Paragraph No. 0064 to No. 0067 and so on in Patent Document 1). A signal writing period and a mobility correction period are determined by the pulse width of the write scanning signal.

SUMMARY OF THE INVENTION

A scanning circuit generating the write scanning signal is configured by using a logic circuit including transistors and the like. When there are variations in characteristics of transistors included in the logic circuit, the pulse width of the write scanning signal, namely, the length of the mobility correction period also varies.

In the related technique described in Patent Document 1, the falling timing of the write scanning signal which determines the pulse width of the write scanning signal is determined by the falling timing of the power source potential falling in the pulse state. Therefore, the falling timing of the write scanning signal does not affected by variations of transistor characteristics.

However, in the case of the mobility correction period, the rising timing of the write scanning signal is determined by the logic circuit, which is different from the case of the threshold correction period in which the rising timing is determined by the rising timing of the power source potential. Therefore, when transistor characteristics vary, the pulse width of the write scanning signal, namely, the length of the mobility correction period varies.

When the length of the mobility correction period "t" varies by Δt, an electric current $I_{ds}$ flowing in the drive transistor driving the organic EL device at the time of emitting light varies by $\Delta I_{ds}$, therefore, variation in the length of the mobility correction period "t" will be directly the difference in light emission luminance of the organic EL devices. That is, luminance unevenness occurs on a display screen due to variation of the length of the mobility correction period "t" caused by variation in transistor characteristics.

In order to prevent effects of transistor characteristics, it can be considered to apply a method of determining the rising timing of the write scanning signal by the rising timing of the power source potential. However, it is necessary to double the number of on/off times of power source potential as compared with the case of determining the rising timing of the write scanning signal by the logic circuit to apply the above method. That is because both the write scanning signal determining the threshold correction period as well as the write scanning signal determining the mobility correction period in the logic circuit are generated based on single power source potential (the details of which will be described later). When the number of on/off times of power source potential is doubled, power consumption is increased.

In view of the above, it is desirable to provide a display device, a driving method of the display device and an electronic apparatus including the display device capable of suppressing variations in the length of the mobility correction period and suppressing luminance unevenness due to the variations without incurring the increase of power consumption.

According to an embodiment of the invention, there is provided a display device including a pixel array unit in which plural pixels are arranged, each including an electro-optic device, a write transistor writing a video signal, a storage capacitor storing the video signal written by the write transistor and a drive transistor driving the electro-optic device based on the video signal stored in the storage capacitor, which have a function of correcting mobility of the drive transistor, in which a write scanning signal given to gate electrodes of the write transistors while sequentially scanning respective pixels in the pixel array row by row is generated based on respective timings of rising and falling of one pulse-state power source potential.

As the write scanning signal is generated based on respective timings of rising and falling of one pulse-state power source potential, respective timings of rising and falling of the write scanning signal are not affected by variations of transistor characteristics as in the case of generating the write scanning signal in a logic circuit. Respective timings of rising and falling of the write scanning signal determine a mobility correction period. Therefore, the length of the mobility correction period does not vary due to variations of transistor characteristics. The number of on/off times of the pulse-state power source potential may be the same as in the case of determining the rising timing of the write scanning signal by the logic circuit, therefore, the increase of power consumption is not incurred.

According to the embodiment of the invention, variations in length of the mobility correction period can be suppressed without incurring the increase of power consumption, therefore, luminance unevenness due to the variations can be suppressed with low power consumption.

BRIEF DESCRIPTION OF THE DRAWINGS

FIGS. 17A, 17B are perspective views showing appearance of a digital camera to which the invention is applied, in which FIG. 17A is a perspective view seen from the front side and FIG. 17B is a perspective view seen from the reverse side;

FIGS. 20A to 20G are appearance views showing a cellular phone device to which the invention is applied, in which FIG. 20A is a front view in an opened state, FIG. 20B is a side view thereof, FIG. 20C is a front view in a closed state, FIG. 20D is a left-side view, FIG. 20E is a right-side view, FIG. 20F is an upper surface view and FIG. 20G is a bottom surface view.

DESCRIPTION OF THE PREFERRED EMBODIMENTS

Hereinafter, modes for carrying out the invention (hereinafter referred to as "embodiments") will be explained in detail with reference to the drawings. The explanation will be made in the following order.

1. Organic EL display device to which an embodiment of the invention is applied
   1-1. System configuration
   1-2. Basic circuit operations
   1-3. Write scanning circuit according to related art example
2. Explanation of organic EL device according to embodiments
   2-1. Embodiment 1
   2-2. Embodiment 2
3. Modification example
4. Application example (electronic apparatus)

<1. Organic EL Display Device to which the Invention is Applied>

[1-1. System Configuration]

Figure 1:
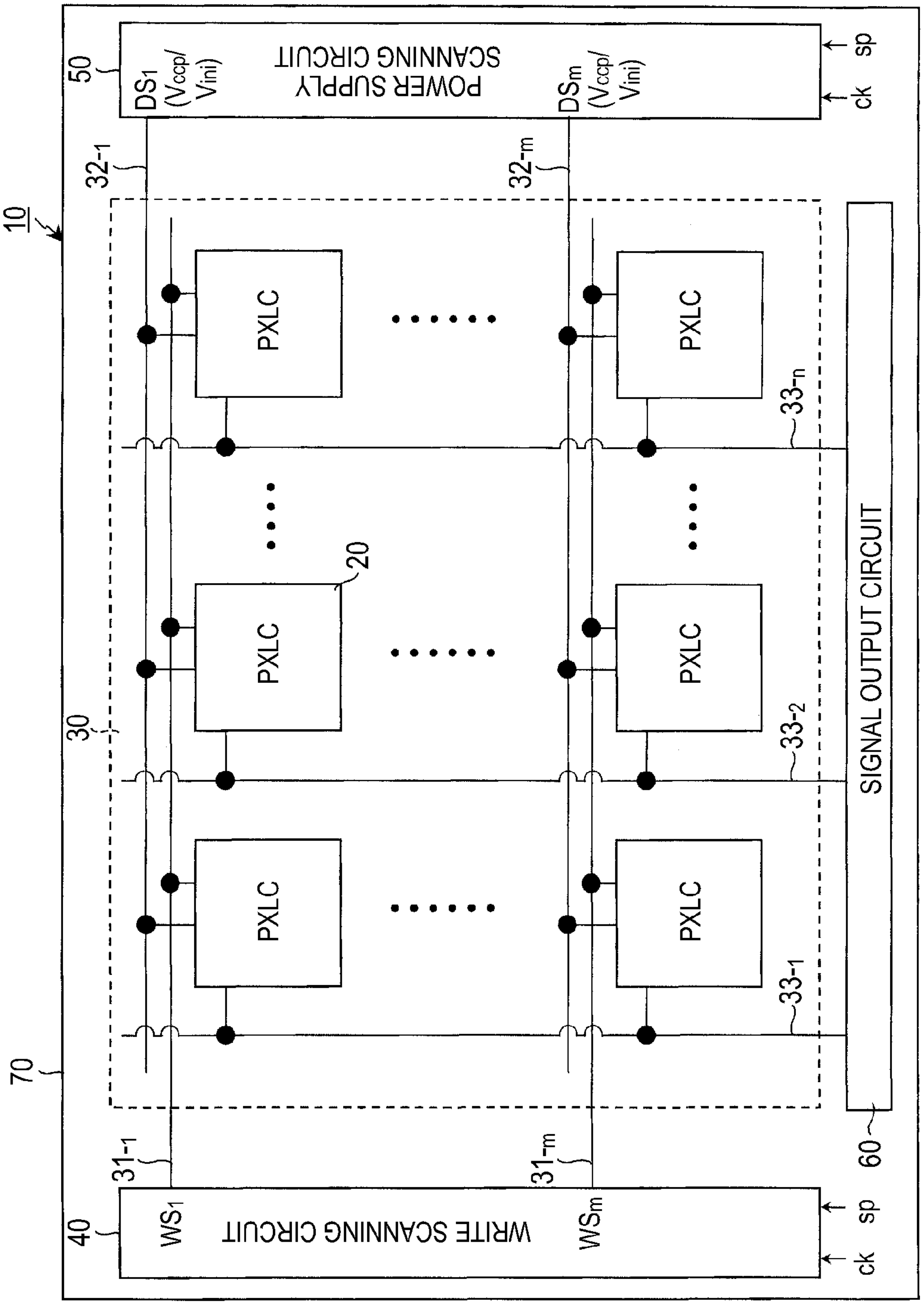
FIG. 1 is a system configuration diagram showing a configuration outline of an organic EL display device to which an embodiment of the invention is applied.

FIG. 1 is a system configuration diagram showing a configuration outline of an active matrix display device to which the invention is applied.

The active matrix display device is a display device controlling electric current flowing in an electro-optic device by an active device, for example, an insulating-gate type field-effect transistor provided in the same pixel where the electro-optic device is provided. As the insulating-gate type field-effect transistor, a TFT (Thin Film Transistor) is commonly used.

Here, a case of an active-matrix organic EL display device will be explained as an example, which uses the current-driven type electro-optic device in which light emission luminance varies according to a current value flowing in the device, for example, an organic EL device as a light emitting element.

As shown in FIG. 1, an organic EL display device 10 according to the application example includes plural pixels 20 including organic EL devices, a pixel array unit 30 in which the pixels 20 are arranged two-dimensionally in a matrix state and a drive unit arranged in the vicinity of the pixel array unit 30. The drive unit includes a write scanning circuit 40, a power supply scanning circuit 50, a signal output circuit 60 and so on, which drives respective pixels 20 in the pixel array unit 30.

When the organic EL display device 10 performs color display, one pixel includes plural sub-pixels and respective sub-pixels correspond to pixels 20. More specifically, in the display for color display one pixel includes three sub-pixels which are a sub-pixel emitting red light (R), a sub-pixel emitting green light (G) and a sub-pixel emitting blue light (B).

The sub-pixel combination is not limited to combination of three primary colors of RGB in one pixel, and it is possible that one pixel is formed by further adding sub-pixels of one or plural colors to three-primary color sub-pixels. More specifically, it is possible to form one pixel, for example, by adding a sub-pixel emitting white light (W) for improving luminance, or to form one pixel by adding at least one sub-pixel emitting complementary color light for expanding the color reproduction range.

In the pixel array unit 30, scanning lines $\mathbf{31}_{-1}$ to $\mathbf{31}_{-m}$ and power supply lines $\mathbf{32}_{-1}$ to $\mathbf{32}_{-m}$ are arranged along a row direction (pixel arrangement direction of pixel rows) at respective pixel rows in the arrangement of pixels 20 in m-rows and n-columns. Further, signal lines $\mathbf{33}_{-1}$ to $\mathbf{33}_{-n}$ are arranged along a column direction (pixel arrangement direction of pixel columns) at respective pixel columns.

The scanning lines $\mathbf{31}_{-1}$ to $\mathbf{31}_{-m}$ are connected to output terminals of corresponding rows of the write scanning circuit 40 respectively. The power supply lines $\mathbf{32}_{-1}$ to $\mathbf{32}_{-m}$ are connected to output terminals of corresponding rows of the power supply scanning circuit 50 respectively. The signal lines $\mathbf{33}_{-1}$ to $\mathbf{33}_{-n}$ are connected to output terminals of corresponding columns of the signal output terminal 60 respectively.

The pixel array unit 30 is usually formed on a transparent insulating substrate such as a glass substrate. Therefore, the organic EL display device 10 has a planer-type (flat-type) panel structure. A drive circuit of each pixel 20 in the pixel array unit 30 can be formed by using an amorphous silicon TFT or a low-temperature polysilicon TFT. When the low-temperature polysilicon TFT is used, the write scanning circuit 40, the power supply scanning circuit 50 and the signal output circuit 60 can be also mounted on a display panel (substrate) 70 in which the pixel array unit 30 is formed.

The write scanning circuit 40 includes a shift register sequentially shifting (transferring) a start pulse "sp" in synchronization with a clock pulse "ck". The write scanning circuit 40 sequentially supplies write scanning signals WS ($WS_1$ to $WS_m$) to the scanning lines $\mathbf{31}_{-1}$ to $\mathbf{31}_{-m}$ at the time of writing video signals to respective pixels 20 in the pixel array unit 30 to thereby sequentially scan (line-sequential scanning) respective pixels 20 in the pixel array unit 30 row by row.

The power supply scanning circuit 50 includes the shift register sequentially shifting the start pulse "sp" in synchronization with the clock pulse "ck". The power supply scanning circuit 50 supplies power source potentials DS ($DS_1$ to $DS_m$) which can be switched between a first power source potential $V_{ccp}$ and a second power source potential $V_{ini}$ which is lower than the first power source potential $V_{ccp}$ to the power supply line $\mathbf{32}_{-1}$ to $\mathbf{32}_{-m}$ in synchronization with the line-sequential scanning by the write scanning circuit 40. As described later, control of light emission/non-light emission of pixels 20 is performed by switching of $V_{ccp}/V_{ini}$ of the power source potentials DS.

The signal output circuit 60 selectively outputs a signal voltage $V_{sig}$ (hereinafter may be referred to as merely "signal voltage") of a video signal corresponding to luminance information supplied from a signal supply source (not shown) and a reference voltage $V_{ofs}$. Here, the reference voltage $V_{ofs}$ is voltage to be a reference of the signal voltage $V_{sig}$ of the video signal (for example, voltage corresponding to a black level of the video signal), which is used at the time of later-described threshold correction processing.

The signal voltage $V_{sig}$/the reference voltage $V_{ofs}$ outputted from the signal output circuit 60 are written in respective pixels 20 of the pixel array unit 30 through the signal lines $\mathbf{33}_{-1}$ to $\mathbf{33}_{-n}$ in units of pixel rows selected by scanning by the write scanning circuit 40. That is, the signal output circuit 60 applies a drive state of the line-sequential writing in which signal voltage $V_{sig}$ is written row by row (line by line).

(Pixel Circuit)

Figure 2:
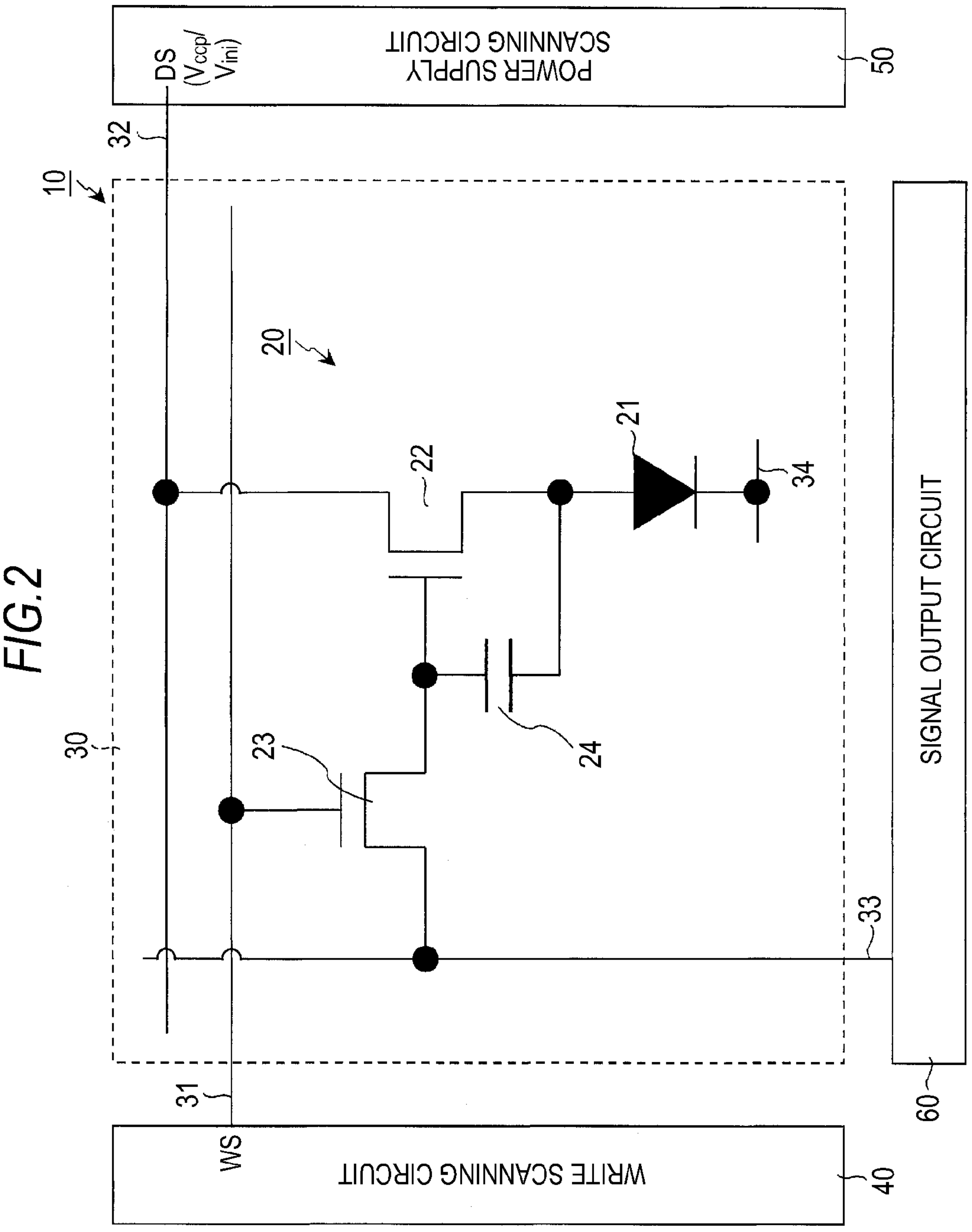
FIG. 2 is a circuit diagram showing an example of a circuit configuration of a pixel of the organic EL display device to which the invention is applied.

FIG. 2 is a circuit diagram showing a specific circuit configuration of the pixel (pixel circuit) 20.

As shown in FIG. 2, the pixel 20 includes the organic EL device 21 as the current-driven type electro-optic device in which light emission luminance varies according to a current value flowing in the device and the drive circuit driving the organic EL device 21 by allowing electric current to flow in the organic EL device 21. In the organic EL device 21, a cathode electrode is connected to a common power supply line 34 wired (so-called solid wiring) to all pixels 20 in common.

The drive circuit which drives the organic EL device 21 includes the drive transistor 22, the write transistor 23 and the storage capacitor 24. An N-channel TFT can be used as the drive transistor 22 and the write transistor 23. The combination of the conductive type in the drive transistor 22 and the write transistor 23 is just an example, and it not limited to the combination.

When the N-channel TFT is used as the drive transistor 22 and the write transistor 23, the circuit can be formed by using an amorphous silicon (a-Si) process. It is possible to reduce costs of a substrate on which the TFT is formed as well as to reduce costs of the organic EL display device 10 by using the a-Si process. When the drive transistor 22 and the write transistor 23 are formed in the combination of the same conductive type, the transistors 22, 23 can be formed in the same process, which contributes to the cost reduction.

In the drive transistor 22, one electrode (source/drain electrode) is connected to an anode electrode of the organic EL device 21 and the other electrode (drain/source electrode) is connected to the power supply line 32 ($\mathbf{32}_{-1}$ to $\mathbf{32}_{-m}$).

In the write transistor 23, one electrode (a source/drain electrode) is connected to the signal line 33 ($\mathbf{33}_{-1}$ to $\mathbf{33}_{-n}$) and the other electrode (a drain/source electrode) is connected to a gate electrode of the drive transistor 22. A gate electrode of the write transistor 23 is connected to the scanning line 31 (31$_{-1}$ to 31$_{-m}$).

In the drive transistor 22 and the write transistor 23, one electrode indicate metal wiring electrically connected to a source/drain region and the other electrode indicates metal wiring electrically connected to a drain/source region. One electrode may be a source electrode or a drain electrode as well as the other electrode may be the drain electrode of the source electrode according to the potential relation between one electrode and the other electrode.

In the storage capacitor 24, one electrode is connected to the gate electrode of the drive transistor 22 and the other electrode is connected to the other electrode of the drive transistor 22 and the anode electrode of the organic EL device 21.

The drive circuit of the organic EL device 21 is not limited to the circuit configuration including two transistors which are the drive transistor 22 and the write transistor 23 and one capacitor element which is the storage capacitor 24. For example, it may be possible to apply a configuration in which an auxiliary capacitor compensating capacity shortage of the organic EL element 21 is provided according to need by connecting one electrode to the anode electrode of the organic EL device 21 and connecting the other electrode to a fixed potential respectively.

In the pixel 20 having the above configuration, the write transistor 23 becomes conductive in response to a high-active write scanning signal WS to be applied to the gate electrode from the write scanning circuit 40 through the scanning line 31. Accordingly, the write transistor 23 performs sampling of the signal voltage $V_{sig}$ or the reference voltage $V_{ofs}$ of the video signal corresponding to luminance information supplied from the signal output circuit 60 through the signal line 33 and writes the voltage in the pixel 20. The written signal voltage $V_{sig}$ or the reference voltage $V_{ofs}$ are applied on the gate electrode of the drive transistor 22 as well as stored in the storage capacitor 24.

When the potential DS of the power supply line 32 (32-1 to 32-*m*) is in the first power source potential Vccp, the drive transistor 22 operates in a saturated region by taking one electrode as the drain electrode and the other electrode as the source electrode. Accordingly, the drive transistor 22 receives current supply from the power supply line 32 and drives the organic EL device 21 by current to emit light. More specifically, the drive transistor 22 operates in the saturated region to thereby supply to the organic EL device 21 drive current of a current value corresponding to a voltage value of the signal voltage $V_{sig}$ stored in the storage capacitor 24 and to drive the organic EL device 21 by current to emit light.

When the power source potential DS is switched from the first power source potential $V_{ccp}$ to the second power source potential $V_{ini}$, the drive transistor 22 operates as a switching transistor by taking one electrode as the drain electrode and the other electrode as the source electrode. Accordingly, the drive transistor 22 stops supply of drive current to the organic EL device 21 to allow the organic EL device 21 to be in a non-light emitting state. That is, the drive transistor 22 also has a function as a transistor controlling light emission/non-light emission of the organic EL device 21.

According to the switching operation of the drive transistor 22, it is possible to provide a period when the organic EL device 21 is in the non-light emitting state (non-light emission period) and to control the ratio (duty) of a light emission period and the non-light emission period of the organic EL device 21. According to the duty control, residual image blur due to the light emission of the pixel during one display frame period can be reduced, therefore, image quality of moving images can be particularly made excellent.

In the first and second power source potentials $V_{ccp}$, $V_{ini}$ selectively supplied from the power supply scanning circuit 50 through the power supply lines 32, the first power source potential $V_{ccp}$ is a power source potential for supplying drive current which drives the organic EL device 21 to emit light to the drive transistor 22. The second power source potential $V_{ini}$ is a power source potential for reversely biasing the organic EL device 21. The second power source potential $V_{ini}$ is set to a potential lower than the reference potential $V_{ofs}$, for example, a potential lower than $V_{ofs}-V_{th}$ when the threshold voltage of the drive transistor 22 is $V_{th}$, preferably a potential sufficiently lower than $V_{ofs}-V_{th}$.

(Pixel Configuration)

Figure 3:
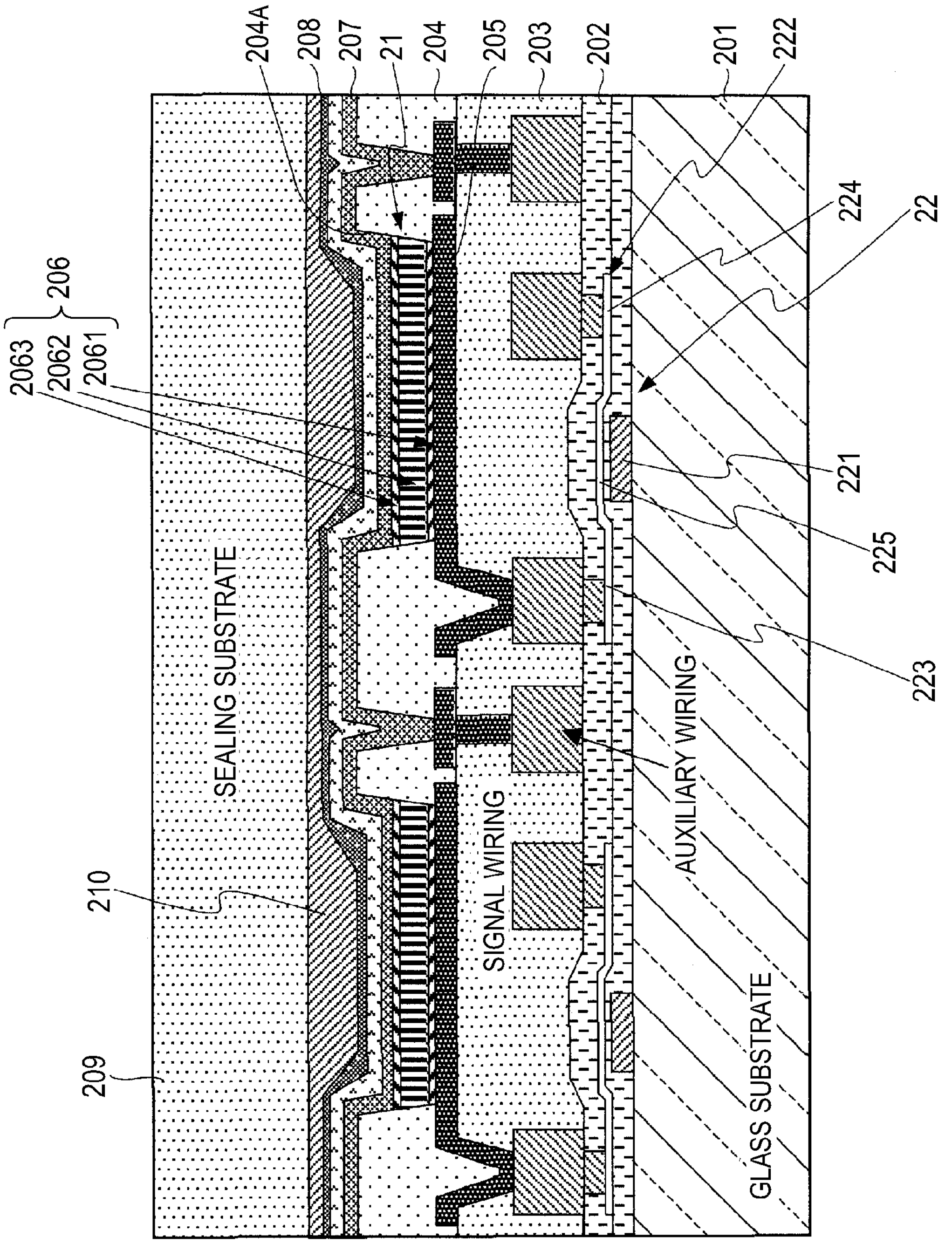
FIG. 3 is a cross-sectional view showing an example of a cross-sectional configuration of the pixel.

FIG. 3 is a cross-sectional view showing an example of a cross-sectional configuration of the pixel 20. As shown in FIG. 3, the drive circuit including the drive transistor 22 and the like is formed on the glass substrate 201. The pixel 20 has a configuration in which an insulating film 202, an insulating planer film 203 and a window insulating film 204 are formed in this order on the glass substrate 201, and the organic EL device 21 is formed in a concave portion 204A of the window insulating film 204. Here, only the drive transistor 22 is shown in respective components of the drive circuit, and other components are omitted.

The organic EL device 21 includes an anode electrode 205, an organic layer (an electron transporting layer, a light emission layer, a hole transporting layer/hole injection layer) 206 and a cathode electrode 207. The anode electrode 205 is made of metal and the like formed at the bottom of the concave portion 204A of the window insulating film 204. The organic layer 206 is formed on the anode electrode 205. The cathode electrode 207 is made of a transparent conductive film and the like formed in common with respect to all pixels over the organic layer 206.

In the organic EL device 21, the organic layer 206 is formed by sequentially depositing a hole transporting layer/hole injection layer 2061, a light emission layer 2062, a electron transporting layer 2063 and an electron injection layer (not shown) on the anode electrode 205. Then, when electric current flows in the organic layer 206 from the drive transistor 22 through the anode electrode 205 under the current drive by the drive transistor 22 of FIG. 2, light is emitted in the light emission layer 2062 in the organic layer 206 when electrons and holes are recombined there.

The drive transistor 22 includes a gate electrode 221, source/drain regions 223, 224 provided at both sides of a semiconductor layer 222, and a channel forming region 225 at a portion facing the gate electrode 221 of the semiconductor layer 222. The source/drain region 223 is electrically connected to the anode electrode 205 of the organic EL device 21 through a contact hole.

After the organic EL device 21 is formed on the glass substrate 201 through the insulating film 202, the insulating planer film 203 and the window insulating film 204 in each pixel, a sealing substrate 209 is bonded by using an adhesive 210 through a passivation film 208. The organic EL device 21 is sealed by the sealing substrate 209 to thereby form a display panel 70.

[1-2. Basic Circuit Operations]

Subsequently, basic circuit operations of the organic EL display device 10 having the above configuration will be explained by using operation explanation views of FIGS. 5A to 5D and FIGS. 6A to 6D based on a timing waveform chart of FIG. 4. In the operation explanation views of 5A to 5D and FIGS. 6A to 6D, the write transistor 23 is shown as a symbol of a switch for simplifying the drawings. An equivalent capacitor 25 of the organic EL device 21 is also shown.

Figure 4:
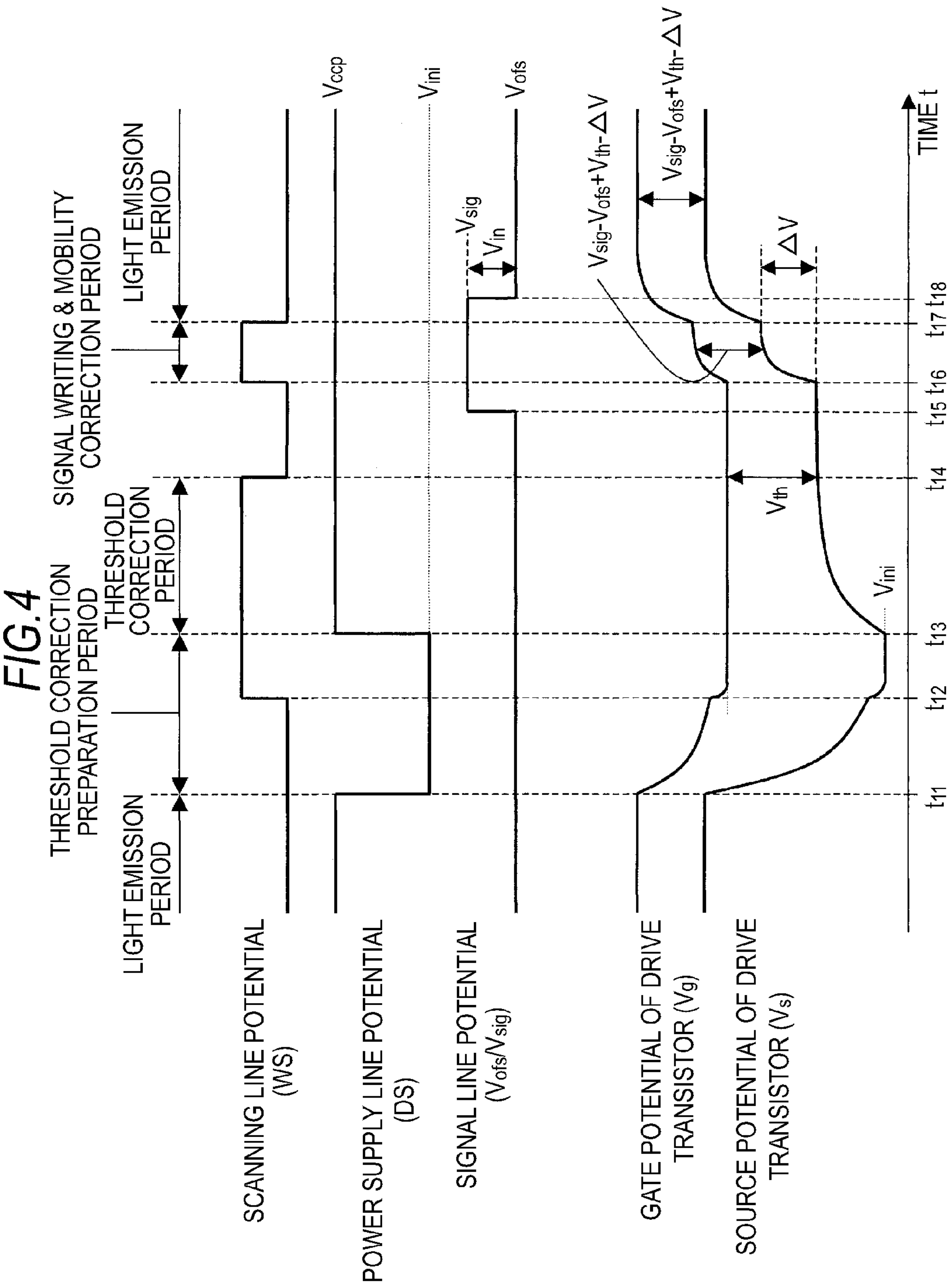
FIG. 4 is a timing waveform chart used for explaining basic circuit operations of the organic EL display device to which the invention is applied.

In the timing waveform chart of FIG. 4, variations of the potential of the scanning line 31 (write scanning signal) WS, the potential of the power supply line 32 (power source potential) DS, the potential of the signal line 33 ($V_{sig}/V_{ofs}$) a gate potential $V_g$ and a source potential $V_s$ of the drive transistor 22 are shown.

(Light Emission Period of a Previous Display Frame)

In the timing waveform chart of FIG. 4, a period before a time point "t11" is a light emission period of the organic EL device 21 in a previous display frame. In the light emission period of the previous display frame, the potential DS of the power supply line 32 is in the first power source potential (hereinafter referred to as "high potential") $V_{ccp}$, and the write transistor 23 is in the non-conductive state.

Figure 5A:
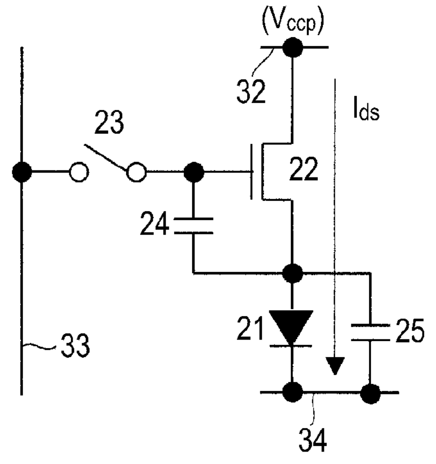
FIGS. 5A to 5D are operation explanation views (No. 1) of basic circuit operations of the organic EL display device to which the invention is applied.

At this time, the drive transistor 22 is designed to operate in the saturated region. Accordingly, drive current (drain-source current) $I_{ds}$ corresponding to the gate-source voltage $V_{gs}$ of the drive transistor 22 is supplied to the organic EL device 21 from the power supply line 32 through the drive transistor 22 as shown in FIG. 5A. Consequently, the organic EL device 21 emits light with luminance corresponding to the current value of the drive current $I_{ds}$.

(Threshold Correction Preparation Period)

Figure 5B:
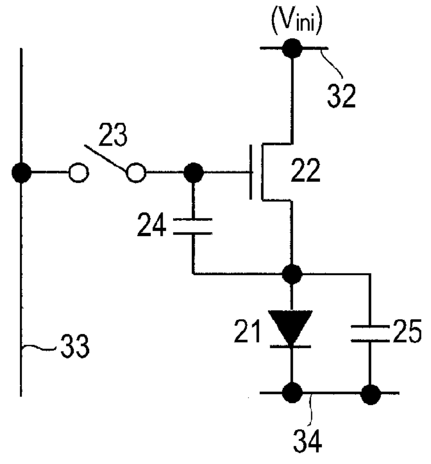

At the time point "t11", line-sequential scanning enters a new display frame (present display frame). Then, the potential DS of the power supply line 32 is switched from the high potential $V_{ccp}$ to the second power source potential (hereinafter referred to as "low potential") $V_{ini}$ which is sufficiently lower than $V_{ofs}-V_{th}$ with respect to the reference voltage $V_{ofs}$ of the signal line 33 as shown in FIG. 5B.

Here, assume that a threshold voltage of the organic EL device 21 is $V_{thel}$ and a potential (cathode potential) of the common power supply line 34 is $V_{cath}$. In this case, when the low potential $V_{ini}$ is $V_{ini}<V_{thel}+V_{cath}$, a source potential $V_s$ of the drive transistor 22 is almost equivalent to the low potential $V_{ini}$, therefore, the organic EL device 21 is in a reverse bias state and does not emit light.

Figure 5C:
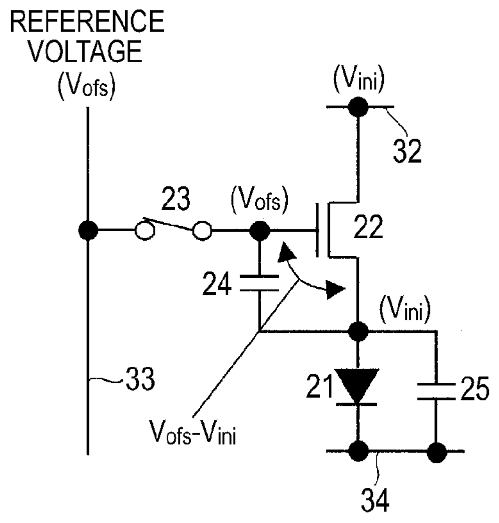

Next, the potential WS of the scanning line 31 is changed from the low-potential side to the high-potential side at a time point "t12", which makes the write transistor 23 to be conductive as shown in FIG. 5C. At this time, the reference voltage $V_{ofs}$ is supplied to the signal line 33 from the signal output circuit 60, therefore, the gate potential $V_g$ of the drive transistor 22 becomes the reference potential $V_{ofs}$. The source potential $V_s$ of the drive transistor 22 is in the potential $V_{ini}$ which is sufficiently lower than the reference voltage $V_{ofs}$.

At this time, the gate-source voltage $V_{gs}$ of the drive transistor 22 will be $V_{ofs}-V_{ini}$. Here, if $V_{ofs}-V_{ini}$ is not larger than the threshold voltage $V_{th}$ of the drive transistor 22, it is difficult to perform later-described threshold correction processing, therefore, it is necessary to set the potential relation to $V_{ofs}-V_{ini}>V_{th}$.

Accordingly, the processing of fixing the gate potential $V_g$ of the drive transistor 22 to the reference voltage $V_{ofs}$ and fixing (determining) the source potential $V_s$ to the low potential $V_{ini}$ to be initialized is the processing of preparation (threshold correction preparation) before performing the later-described threshold correction processing (threshold correction operation). Therefore, the reference voltage $V_{ofs}$ and the lower potential $V_{ini}$ are respective initialization potentials of the gate potential $V_g$ and the source potential $V_s$ of the drive transistor 22.

(Threshold Correction Period)

Figure 5D:
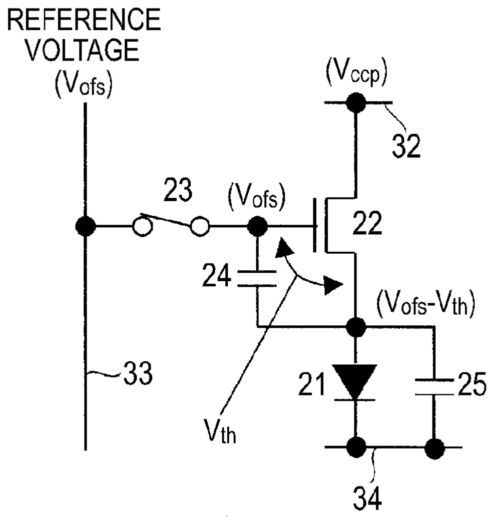

Next, when the potential DS of the power supply line 32 is switched from the low potential $V_{ini}$ to the high potential $V_{ccp}$ at a time point "t13", the threshold correction processing is started in the state of maintaining the gate potential $V_s$ of the drive transistor 22 as shown in FIG. 5D. That is, the source potential $V_s$ of the drive transistor 22 begins to increase toward a potential obtained by subtracting the threshold voltage $V_{th}$ of the drive transistor 22 from the gate potential Vg.

Here, the processing of changing the source potential $V_s$ toward the potential obtained by subtracting the threshold voltage $V_{th}$ of the drive transistor 22 from the initialization potential $V_{ofs}$ based on the initialization potential $V_{ofs}$ of the gate electrode of the drive transistor 22 is called threshold correction processing for convenience. As the threshold correction processing proceeds, the gate-source voltage $V_{gs}$ of the drive transistor 22 converges to the threshold voltage $V_{th}$ of the drive transistor 22. The voltage corresponding to the threshold voltage $V_{th}$ is stored in the storage capacitor 24.

In the period when the threshold correction processing is performed (threshold correction period), the potential $V_{cath}$ of the common power supply line 34 is set so that the organic EL device 21 is in a cut-off state in order to allow electric current to flow only to the side of the storage capacitor 24 as well as to prevent electric current from flowing to the side of the organic EL device 21.

Figure 6A:
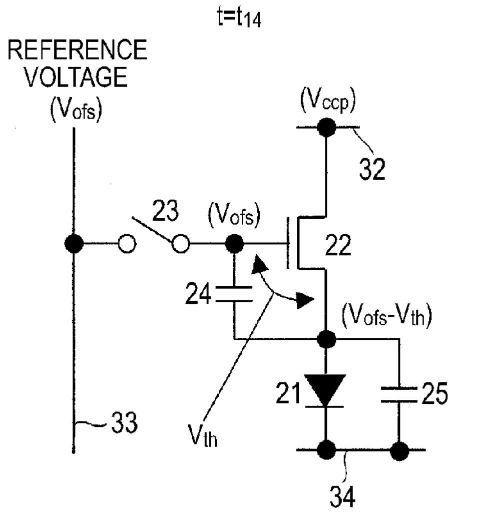
FIGS. 6A to 6D are operation explanation views (No. 2) of basic circuit operations of the organic EL display device to which the invention is applied.

Next, when the potential WS of the scanning line 31 is changed to the low potential side at a time point "t14", the write transistor 23 is in the non-conductive state as shown in FIG. 6A. At this time, the gate electrode of the drive transistor 22 is electrically cut off from the signal line 33 and made to be in a floating state. However, the drive transistor 22 is in the cut-off state because the gate-source voltage $V_{gs}$ is equal to the threshold voltage $V_{th}$. Therefore, the drain-source current $I_{ds}$ does not flow in the drive transistor 22.

(Signal Writing & Mobility Correction Period)

Figure 6B:
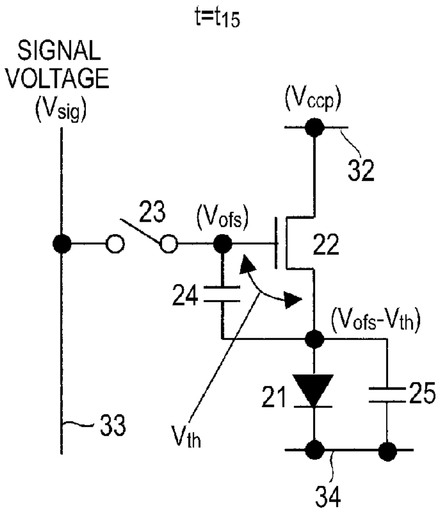
Figure 6C:
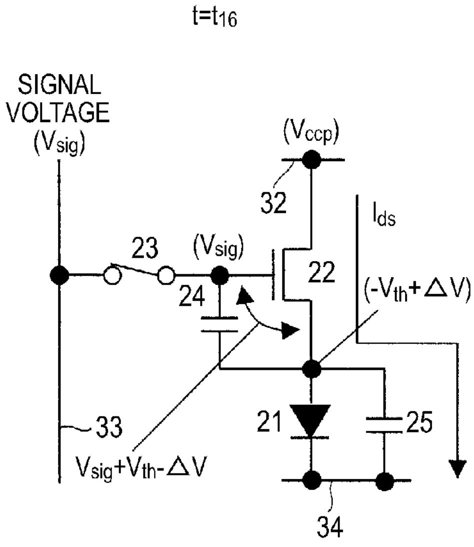

Next, the potential of the signal line 33 is switched from the reference voltage $V_{ofs}$ to the signal voltage $V_{sig}$ of the video signal at a time point "t15" as shown in FIG. 6B. Subsequently, when the potential WS of the scanning line 31 is changed to the high potential side at a time point "t16", the write transistor 23 becomes in the conductive state and performs sampling of the signal voltage $V_{sig}$ of the video signal to be written in the pixel 20 as shown in FIG. 6C.

The gate potential $V_g$ of the drive transistor 22 becomes the signal voltage $V_{sig}$ by the writing of the signal voltage $V_{sig}$ by the write transistor 23. Then, when the drive transistor 22 is driven by the signal voltage $V_{sig}$ of the video signal, the threshold voltage $V_{th}$ of the drive transistor 22 is cancelled out by the voltage corresponding to the threshold voltage $V_{th}$ stored in the storage capacitor 24. The details of the principle of threshold cancellation will be described later.

At this time, the organic EL device 21 is in the cut-off state (high impedance state). Therefore, electric current (drain-source current $I_{ds}$) flowing in the drive transistor 22 from the power supply line 32 in accordance with the signal voltage $V_{sig}$ of the video signal flows into the equivalent capacitor 25 of the organic EL device 21 and charge of the equivalent capacitor 25 is started.

When the equivalent capacitor 25 of the organic EL device 21 is charged, the source potential $V_s$ of the drive transistor 22 is increased with a lapse of time. At this point, variations in the threshold voltage $V_{th}$ of the drive transistor 22 in respective pixels have been already cancelled out, and the drain-source current Ids of the drive transistor 22 depends on a mobility μ of the drive transistor 22. The mobility μ of the drive transistor 22 is the mobility of the semiconductor thin film forming the channel of the drive transistor 22.

Here, assume that the ratio of the storage voltage $V_{gs}$ of the storage capacitor 24 with respect to the signal voltage $V_{sig}$ of the video signal, namely, a write gain G is 1 (desired value). Consequently, when the source potential $V_s$ of the drive transistor 22 is increased to a potential of $V_{ofs}-V_{th}+\Delta V$, the gate-source voltage $V_{gs}$ will be $V_{sig}-V_{ofs}+V_{th}-\Delta V$.

That is, the increased amount ΔV of the source potential $V_s$ of the drive transistor 22 works so as to be subtracted from the voltage stored in the storage capacitor 24 ($V_{sig}-V_{ofs}+V_{th}$) in other words, so as to discharge the stored charges of the storage capacitor 24, which means that negative feedback is given. Therefore, the increased amount ΔV of the source potential $V_s$ is a feedback amount of the negative feedback.

As described above, negative feedback is given to the gate-source voltage $V_{gs}$ by the feedback amount ΔV corresponding to the drain-source current Ids flowing in the drive transistor 22, thereby cancelling out dependence of the drain-source current Ids of the drive transistor 22 with respect to the mobility μ. The processing of cancellation is the mobility correction processing which corrects variations in the mobility μ of the drive transistor 22 in respective pixels.

More specifically, the drain-source current Ids becomes higher as a signal amplitude $V_{in}$ of the video signal ($=V_{sig}-V_{ofs}$) to be written in the gate electrode of the drive transistor 22 becomes higher, therefore, an absolute value of the feedback amount ΔV of negative feedback becomes higher. Accordingly, the mobility correction processing corresponding to the light emission luminance level is performed.

When the signal amplitude $V_{in}$ of the video signal is fixed, the absolute value of the feedback amount ΔV of negative feedback becomes higher as the mobility μ of the drive transistor 22 becomes higher, therefore, variations of the mobility μ in respective pixels can be cancelled. Accordingly, the feedback amount ΔV of negative feedback can be also defined as the correction amount of mobility correction. The details of the principle of mobility correction will be described later.

(Light Emission Period)

Figure 6D:
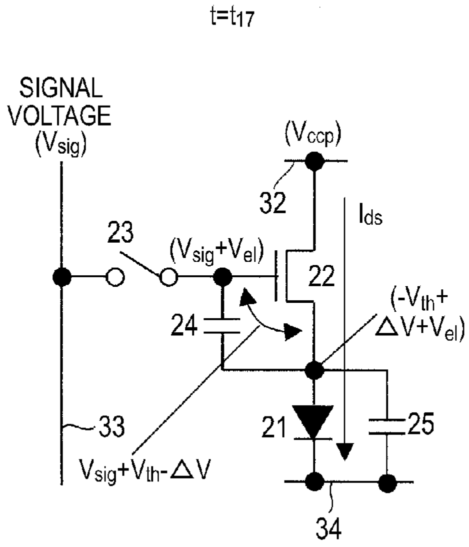

Next, when the potential WS is changed to the low potential side at a time point "t17", the write transistor 23 is in the non-conductive state as shown in FIG. 6D. Accordingly, the gate electrode of the drive transistor 22 is electrically cut off from the signal line 33 and is in the floating state.

Here, when the gate electrode of the drive transistor 22 is in the floating state, the gate voltage $V_g$ varies in conjunction with variations of the source potential $V_s$ of the drive transistor 22 because the storage capacitor 24 is connected between gate/source of the drive transistor 22. The operation in which the gate potential $V_g$ of the drive transistor varies in conjunction with variations of the source potential $V_s$ as described above is bootstrap operation by the storage capacitor 24.

The gate electrode of the drive transistor 22 is in the floating state and the drain-source current $I_{ds}$ of the drive transistor 22 begins to flow in the organic EL device 21 at the same time, as a result, an anode potential of the organic EL device 21 is increased according to the current $I_{ds}$.

When the anode potential of the organic EL device 21 exceeds $V_{thel}+V_{cath}$ drive current begins to flow in the organic EL device 21, therefore, the organic EL device 21 begins to emit light. The increase of the anode potential of the organic EL device 21 is nothing less than the increase of the source potential $V_s$ of the drive transistor 22. When the source potential $V_s$ of the drive transistor 22 is increased, the gate potential $V_g$ of the drive transistor 22 is also increased together due to the bootstrap operation of the storage capacitor 24.

When it is assumed that the bootstrap gain is 1 (desired value), the increased amount of the gate potential $V_g$ is equal to the increased amount of the source potential Vs. Therefore, the gate-source voltage $V_{gs}$ of the drive transistor 22 is maintained to be constant at $V_{sig}-V_{ofs}+V_{th}-\Delta V$ during the light emission period. Then, the potential of the signal line 33 is switched from the signal voltage $V_{sig}$ to the reference voltage $V_{ofs}$ at a time point "t18".

In the series of circuit operations described above, respective processing operations of the threshold correction preparation, threshold correction, writing of the signal voltage $V_{sig}$ (signal writing) and mobility correction are executed in one horizontal scanning period (1 H). The respective processing operations of the signal writing and the mobility correction are executed in parallel during the period between the time points "t16" and "t17".

[Divided Threshold Correction]

The case of applying the driving method of performing the threshold correction processing just once has been explained as an example here, however, the driving method is just an example and is not limited to this method. For example, it is possible to apply a driving method, so called a driving method of a divided threshold correction, in which the threshold correction processing is executed in the 1 H period and plural times separately over plural horizontal scanning periods preceding to the 1 H period during which the threshold correction processing is performed with the mobility correction and the signal writing processing.

According to the driving method of the divided threshold correction, the threshold correction processing can be positively performed even when time assigned to one horizontal scanning period becomes short according to multipixels due to high definition of the device, because sufficient time can be secured over the plural horizontal scanning periods as the threshold correction periods.

[Principle of Threshold Cancellation]

Here, the principle of the threshold cancellation (namely, threshold correction) of the drive transistor 22 will be explained. The drive transistor 22 operates as a constant current source because the transistor is designed so as to operate in the saturated region. Accordingly, fixed drain-source current (drive current) $I_{ds}$ given by the following expression (1) is supplied to the organic EL device 21 from the drive transistor 22.

$$I_{ds}=(1/2)\cdot\mu(W/L)C_{ox}(V_{gs}-V_{th})^2 \quad (1)$$

Here, W denotes a channel width of the drive transistor 22, L denotes a channel length and $C_{ox}$ denotes a gate capacitance per a unit area.

Figure 7:
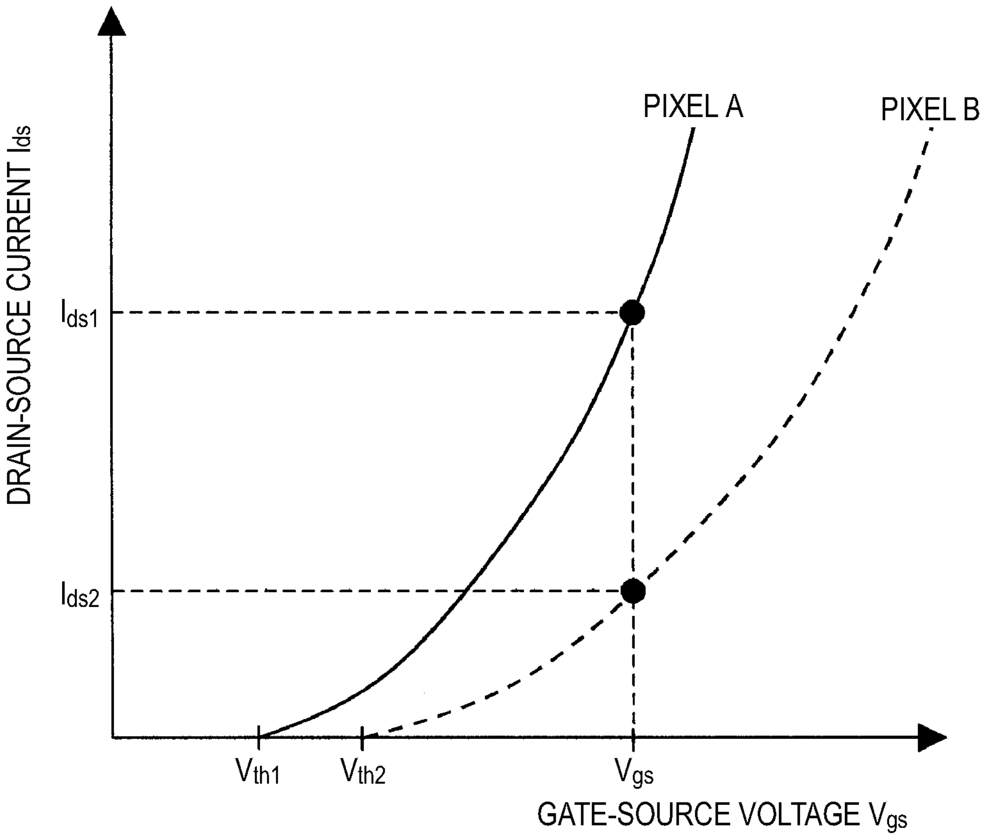
FIG. 7 is a characteristic graph used for explaining a problem due to variations in a threshold voltage $V_{th}$ of a drive transistor.

FIG. 7 shows characteristics of drain-source current $I_{ds}$ with respect to gate-source voltage Vgs in the drive transistor 22.

As shown in the characteristic graph, if the cancellation processing with respect to variations in the threshold voltage $V_{th}$ of the drive transistor 22 in respective pixels is not performed, the drain-source current $I_{ds}$ corresponding to the gate-source voltage $V_{gs}$ will be $I_{ds1}$ when the threshold voltage $V_{th}$ is $V_{th1}$.

When the threshold voltage $V_{th}$ is $V_{th2}$ ($V_{th2}>V_{th1}$), the drain-source current $I_{ds}$ corresponding to the same gate-source voltage $V_{gs}$ will be $I_{ds2}$ ($I_{ds2}<I_{ds1}$). That is, when the threshold voltage $V_{th}$ of the drive transistor 22 varies, the drain-source current $I_{ds}$ varies even when the gate-source voltage $V_{gs}$ is fixed.

On the other hand, the gate-source voltage $V_{gs}$ of the drive transistor 22 during light emission is $V_{sig}-V_{ofs}+V_{th}-\Delta V$ in the pixel (pixel circuit) 20 having the above configuration as described above. Therefore, when the above is substituted into the expression (1), the drain-source current $I_{ds}$ is represented by the following expression (2).

$$I_{ds}=(1/2)\cdot\mu(W/L)C_{ox}(V_{sig}-V_{ofs}-\Delta V)^2 \quad (2)$$

That is, a term of the threshold voltage $V_{th}$ of the drive transistor 22 is cancelled out, and the drain-source current $I_{ds}$ supplied from the drive transistor 22 to the organic EL device 21 does not depend on the threshold voltage $V_{th}$ of the drive transistor 22. As a result, the drain-source current $I_{ds}$ does not vary even when the threshold voltage $V_{th}$ of the drive transistor 22 varies in respective pixels due to variations in manufacturing processes of the drive transistor, variations with time and so on, therefore, the light emission luminance of the organic EL device 21 can be maintained to be constant.

[Principle of Mobility Correction]

Figure 8:
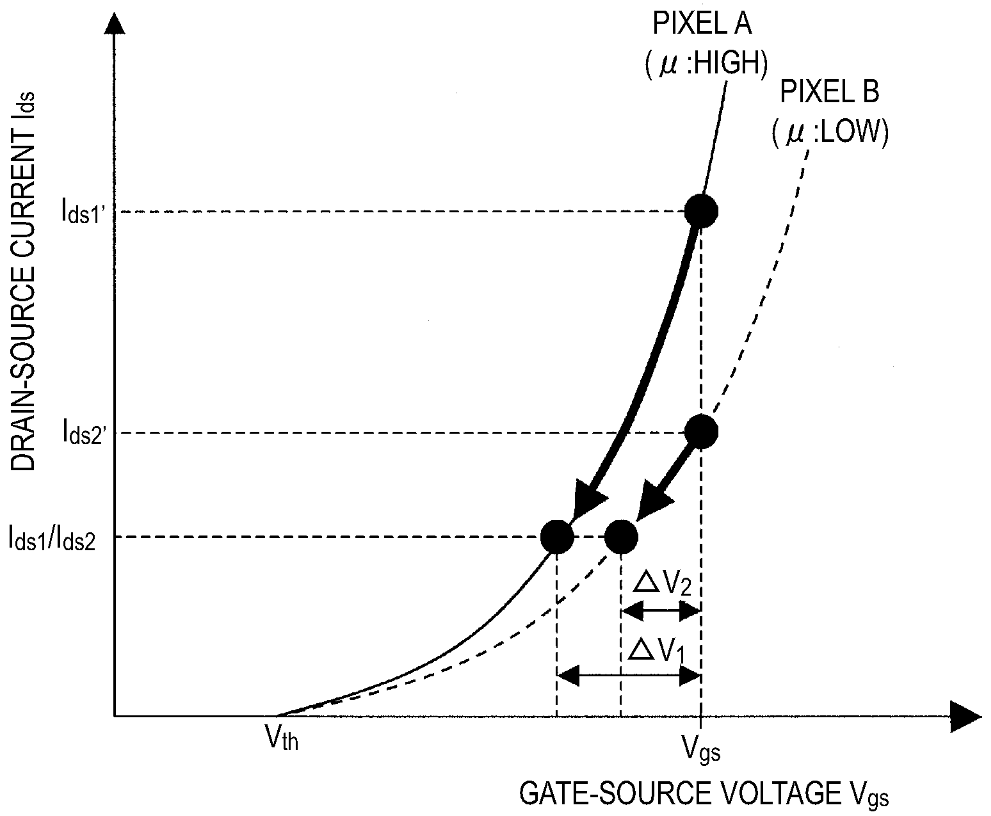
FIG. 8 is a characteristic graph used for explaining a problem due to variations in a mobility $\mu$ of the drive transistor.

Next, the principle of mobility correction of the drive transistor 22 will be explained. FIG. 8 shows characteristic curves obtained by comparing a pixel A the drive transistor 22 of which has relatively high mobility μ with a pixel B the drive transistor 22 of which has relatively low mobility μ. When the drive transistor 22 is made of a polysilicon thin film transistor and the like, it is inevitable that the mobility μ varies between pixels such as the pixel A and the pixel B.

When assuming that, for example, the signal amplitude $V_{in}$ ($=V_{sig}-V_{ofs}$) of the same level is written in the gate electrodes of the drive transistors 22 in both pixels A, B in the state in which the mobility μ varies between the pixel A and the pixel B. In this case, large difference occurs between a drain-source current $I_{ds1'}$ flowing in the pixel A having high mobility μ and a drain-source current $_{ds2'}$ flowing in the pixel B having small mobility μ if no correction of the mobility μ is made. When large difference occurs between pixels in the drain-source current $I_{ds}$ due to variations of the mobility μ in respective pixels as described above, uniformity of the screen is reduced.

As apparent from the transistor characteristic expression in the above expression (1), the drain-source current $I_{ds}$ is increased when the mobility μ is high. Therefore, the feedback amount ΔV in the negative feedback is increased as the mobility μ becomes high. As shown in FIG. 8, the feedback amount $\Delta V_1$ of the pixel A having high mobility μ is larger than the feedback amount $\Delta V_2$ of the pixel B having low mobility μ.

Accordingly, when the negative feedback is given to the gate-source voltage $V_{gs}$ with the feedback amount ΔV corresponding to the drain-source current $I_{ds}$ of the drive transistor 22 by the mobility correction processing, the negative feedback is given with higher amount as the mobility μ becomes higher. As a result, variations of the mobility μ in respective pixels can be suppressed.

Specifically, when correction is made with the feedback amount $\Delta V_1$ in the pixel A having high mobility μ, the drain-source current $I_{ds}$ is decreased from $I_{ds1'}$ to $I_{ds1}$. On the other hand, the feedback amount $\Delta V_2$ of the pixel B having the low mobility μ is small, therefore, the drain-source current $I_{ds}$ is decreased from $I_{ds2'}$ to $I_{ds2}$, which is not so large decrease. As a result, the drain-source current $I_{ds}$ of the pixel A becomes almost equal to the drain-source current $I_{ds}$ of the pixel B, therefore, variations of the mobility μ in respective pixels are corrected.

Summarizing the above mentioned, when there are the pixel A and the pixel B mobility μ of which is different, the feedback amount $\Delta V_1$ of the pixel A having high mobility μ is larger than the feedback amount $\Delta V_2$ of the pixel B having low mobility μ. That is, the higher the mobility μ is, the larger the feedback amount ΔV is, as well as the larger the decreased amount of the drain-source current $I_{ds}$ becomes.

Therefore, when the negative feedback is given to the gate-source voltage $V_{gs}$ with the feedback amount ΔV corresponding to the drain-source current $I_{ds}$ of the drive transistor 22, thereby allowing current values of the drain-source current $I_{ds}$ in pixels having different mobilities μ to be uniform. As a result, variations of the mobility μ in respective pixels can be corrected. That is, the processing of giving negative feedback to the gate-source voltage $V_{gs}$ of the drive transistor 22 with the feedback amount ΔV corresponding to current (drain-source current $I_{ds}$) flowing in the drive transistor 22 can be defined as the mobility correction processing.

Here, the relation between the signal voltage $V_{sig}$ of the video signal and the drain-source current $I_{ds}$ of the drive transistor 22 according to with or without of threshold correction and mobility correction in the pixel (pixel circuit) 20 shown in FIG. 2 will be explained with reference to FIGS. 9A to 9C.

Figure 9A:
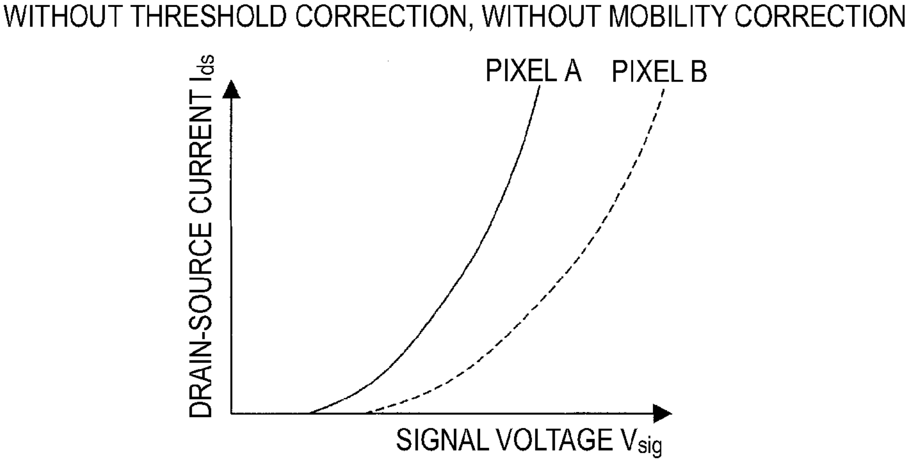
FIGS. 9A to 9C are characteristic views used for explaining the relation between a signal voltage $V_{sig}$ of a video signal and a drain-source current $I_{ds}$ of the drive transistor according to with or without of threshold correction and mobility correction.
Figure 9B:
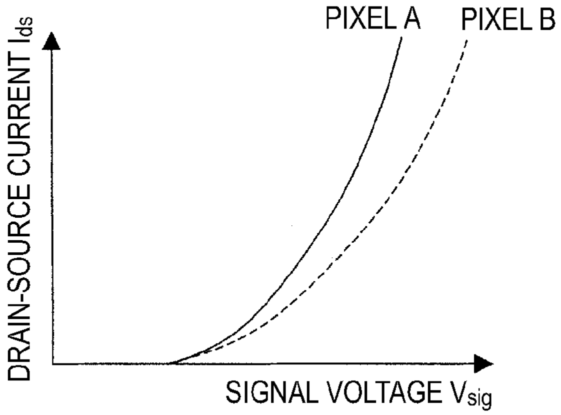
Figure 9C:
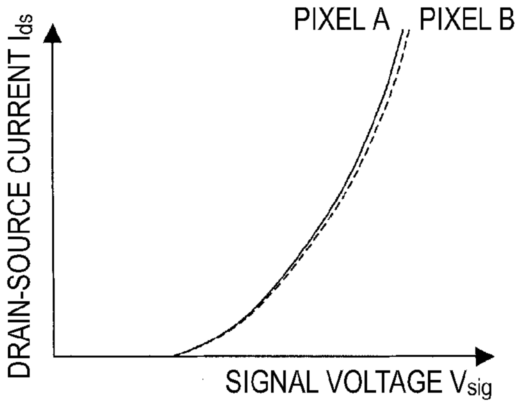

In the drawings, FIG. 9A shows a case in which neither the threshold correction nor the mobility correction is performed, FIG. 9B shows a case in which the mobility correction is not performed but the threshold correction is performed and FIG. 9C shows a case in which both the threshold correction and the mobility correction are performed. As shown in FIG. 9A, when neither the threshold correction nor the mobility correction is performed, large difference occurs in the drain-source current $I_{ds}$ between the pixels A, B due to variations of the threshold voltage $V_{th}$ and the mobility μ in respective pixels A, B.

On the other hand, when only the threshold correction is performed, the difference of the drain-source current $I_{ds}$ between the pixels A, B due to variations of the mobility μ in respective pixels A, B remains though variations of the drain-source current $I_{ds}$ can be reduced to some degree as shown in FIG. 9B. Then, when performing both the threshold correction and the mobility correction, thereby almost eliminating the difference of the drain-source current $I_{ds}$ between the pixels A, B due to variations of the threshold voltage $V_{th}$ and the mobility μ in respective pixels A, B as shown in FIG. 9C. Consequently, luminance variations in the organic EL device 21 do not occur in any tone and display images with good quality can be obtained.

Additionally, the pixel 20 shown in FIG. 2 includes the function of bootstrap operation by the storage capacitor 24 in addition to respective correction functions of the threshold correction and the mobility correction, therefore, the following effects can be obtained.

That is, even when the source potential $V_s$ of the drive transistor 22 varies due to variation with time in I-V characteristics of the organic EL device 21, the gate-source voltage Vgs of the drive transistor 22 can be maintained to be constant due to the bootstrap operation by the storage capacitor 24. Therefore, electric current flowing in the organic EL device 21 is fixed without change. As a result, light emission luminance of the organic EL device 21 is maintained to be constant, therefore, even when I-V characteristics of the organic EL device 21 vary with time, image display without luminance deterioration caused by the variations can be realized.

[1-3. Write Scanning Circuit According to Related Art Example]

As apparent from the basic circuit operations described above, the period of mobility correction performed in parallel to the writing of the signal voltage $V_{sig}$ of the video signal is determined by the pulse width of the write scanning signal WS. The write scanning circuit 40 generating the write scanning signal WS is configured by including a logic circuit and so on formed by transistors, for example, TFTs and the like.

Figure 10:
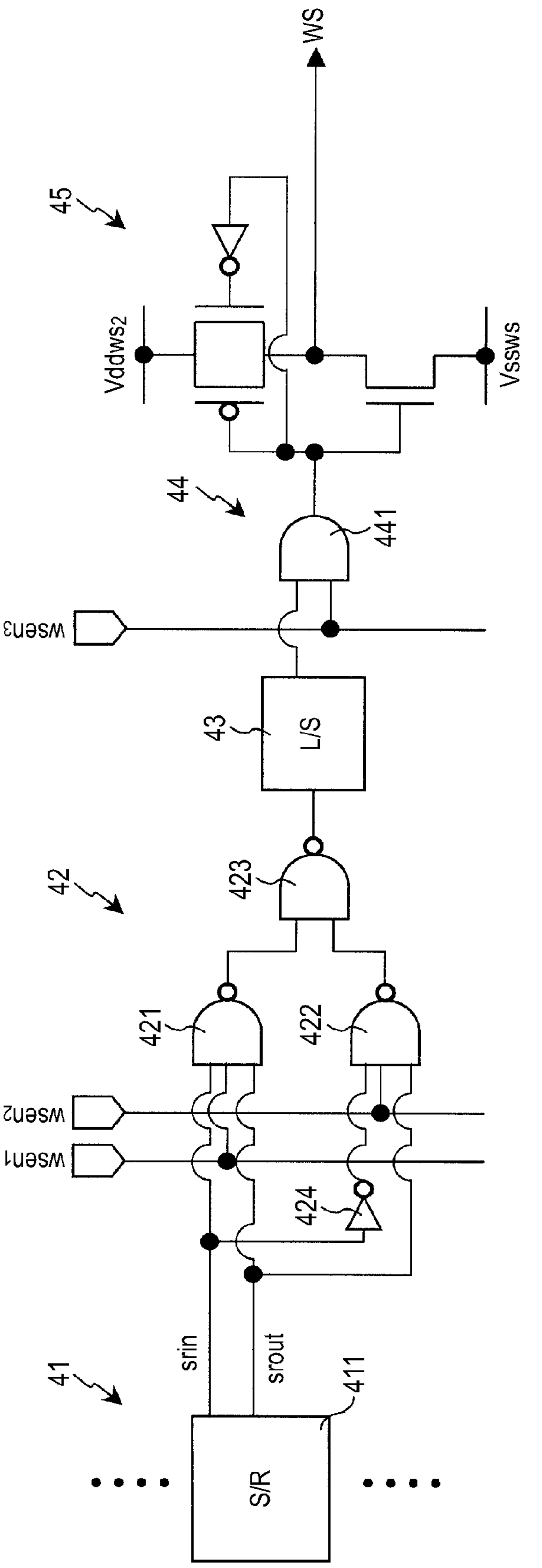
FIG. 10 is a block diagram showing an example of a circuit configuration of a write scanning circuit according to a related art example.

FIG. 10 is a block diagram showing an example of a circuit configuration of a write scanning circuit according to a related art example. Here, the circuit configuration of one unit circuit corresponding to a given pixel row in the write scanning circuit is shown for simplifying the drawing. Actually, the unit circuits corresponding to the number of rows in the pixel array unit 30 are arranged.

As shown in FIG. 10, the write scanning circuit according to the related art example includes a shift register 41, a first logic circuit 42, a level shift circuit 43, a second logic circuit 44 and a buffer circuit 45. The shift register 41 has a configuration in which transfer stages (registers) 411 as unit circuits corresponding to the number of rows in the pixel array unit 30 are connected in cascade.

To the first logic circuit 42, an input pulse "srin" and an output pulse "srout" of each transfer stage 411 are given from the shift register 41. A first enable signal $wsen_1$ and a second enable signal $wsen_2$ are further given to the first logic circuit 42. The first logic circuit 42 includes three NAND circuits 421 to 423 and one inverter 424, performing logical operations concerning the input pulse "srin" and the output pulse "srout" of the transfer stage 411, the first enable signal $wsen_1$ and the second enable signal $wsen_2$.

An output of the first logic circuit 42 is given to the second logic circuit 44 through the level shift circuit 43. The second logic circuit 44 includes an AND circuit 441, performing logical multiplication between the output of the first logic circuit 42 and a third enable signal $wsen_3$. An output of the second logic circuit 44 will be the write scanning signal WS through the buffer circuit 45. The buffer circuit 45 uses a pulse-state power source potential $Vddws_2$ as the positive-side power source potential for determining the falling timing of the write scanning signal WS which determines the signal writing and mobility correction period.

Figure 11:
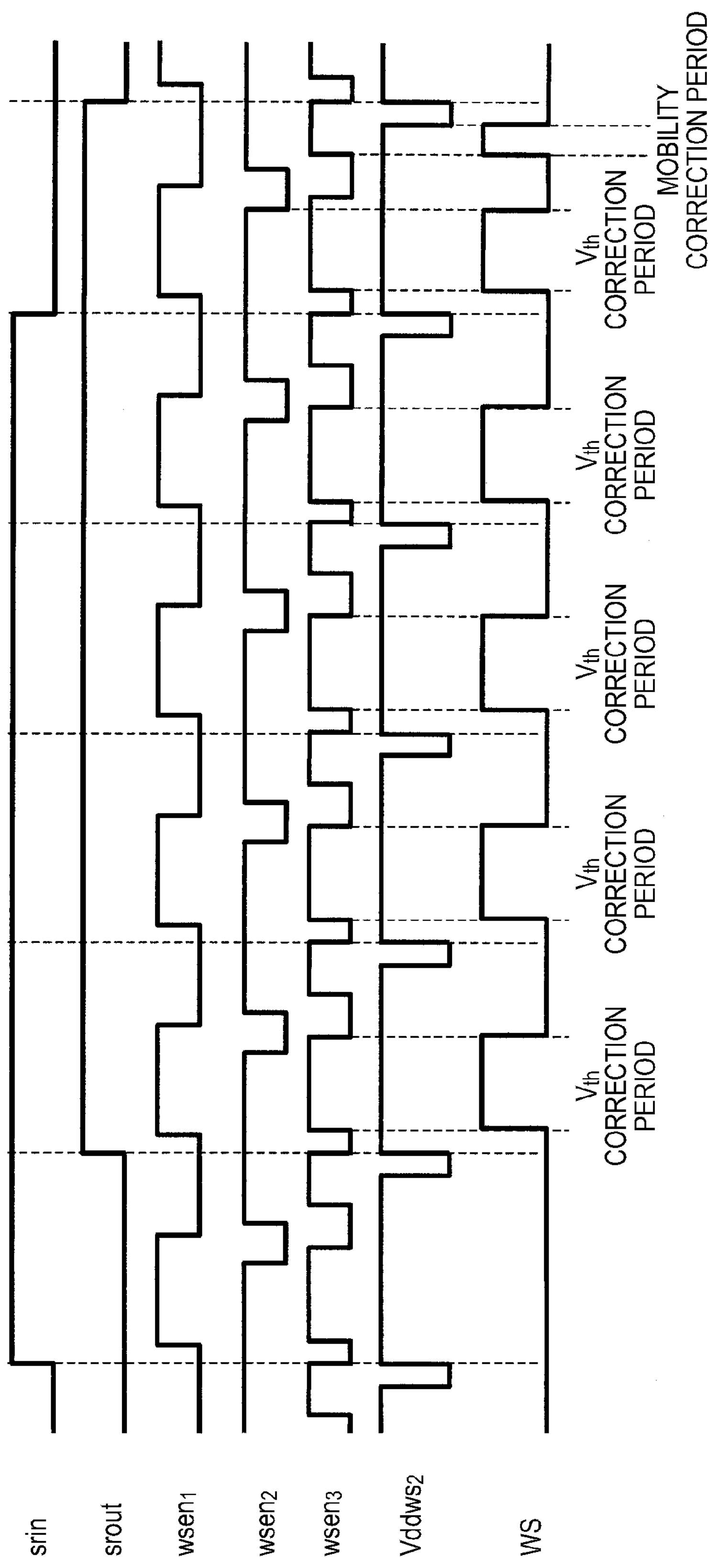
FIG. 11 is a timing waveform chart used for explaining circuit operations of the write scanning circuit according the related art example.

FIG. 11 shows the timing relation of the input pulse "srin" and the output pulse "srout" of the transfer stage 411, the first enable signal swen1, the second enable signal swen2, the third enable signal swen3, the positive-side power source potential $Vddws_2$ and the write scanning signal WS.

The driving method of the divided threshold correction is applied here, and for example, a case in which the threshold correction processing is performed five times in total in the 1 H period and over 4 H periods preceding to the 1 H period in which the threshold correction processing is performed with the mobility correction and signal writing processing is cited as an example.

As apparent from a timing waveform chart of FIG. 11, the rising timing of the write scanning signal WS determining the threshold correction period (referred to as "$V_{th}$ correction period" in FIG. 11) is determined by the rising timing of the third enable signal $wsen_3$. The falling timing of the write scanning signal WS is determined by the falling timing of the second enable signal $wsen_2$.

On the other hand, concerning the write scanning signal WS determining the mobility correction period, the rising timing thereof is determined by the rising timing of the third enable signal $wsen_3$, however, the falling timing thereof is determined by the falling timing of the positive-side power source potential $Vddws_2$.

That is, in the write scanning signal WS determining the mobility correction period, the falling timing of which is determined by the falling timing of the positive-side power source potential $Vddws_2$, whereas the rising timing thereof is determined by the third enable signal $wsen_3$ generated through the second logic circuit 44. Therefore, when transistor characteristics of the transistors forming the second logic circuit 44, for example, the TFTs vary, the pulse width of the write scanning signal WS, namely, the length of the signal writing and mobility correction period (hereinafter may be referred to as merely the mobility correction period) varies.

Figure 12:
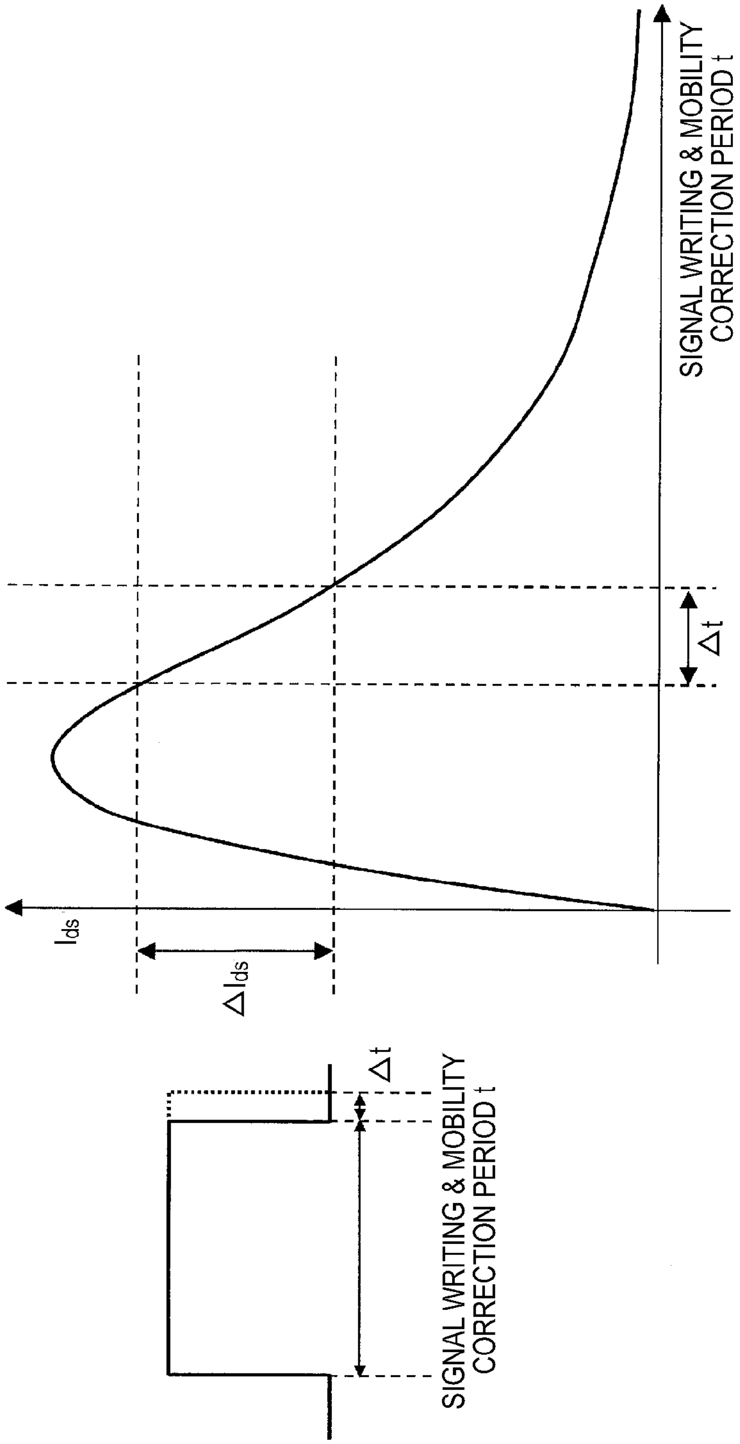
FIG. 12 is an explanation drawing concerning variations in length of the mobility correction period.

As shown in FIG. 12, when a length "t" of the mobility correction period varies by Δt, the current $I_{ds}$ flowing in the drive transistor 22 during light emission varies by $\Delta I_{ds}$, and the variation Δt in the length "t" of the mobility correction period will be directly the difference of the light emission luminance of the organic EL device 21. That is, the variation Δt in the length "t" of the mobility correction period due to variations in transistor characteristics causes luminance unevenness in the display screen.

As described above, it can be considered to apply the method of determining the rising timing of the write scanning signal WS by the rising timing of the positive-side power source potential $Vddws_2$ in order to prevent effects of transistor characteristics. Disadvantages occurring when applying the method will be explained below.

As apparent from FIG. 11, the buffer circuit 45 uses the single pulse-state power source potential $Vddws_2$ as the positive-side power source. The write scanning signal WS determining the threshold correction period is generated based on the result of logical multiplication by the AND circuit 441 using the third enable signal $wsen_3$ in the period of a DC potential of the power source potential $Vddws_2$. In the write scanning signal WS determining the mobility correction period, the rising timing is determined by the rising timing of the third enable signal swen3 and the falling timing is determined by the falling timing of the positive-side power source potential $Vddws_2$ as described above.

Here, in order to determining the rising timing of the write scanning signal WS also by the rising timing of the positive-side power source potential $vddws_2$ for preventing effects of transistor characteristics, it is necessary to double the number of on/off times of the positive-side power source potential $vddws_2$. Because it is necessary to generate the timing at which the positive-side power source potential $Vddws_2$ rises so as to correspond to the rising timing of the write scanning signal WS, because the positive-side power source potential $Vddws_2$ is used also for generating the write scanning signal WS determining the threshold correction period. When the number of on/off times of the positive-side power source potential $vddws_2$ is doubled, power consumption is increased accordingly.

<2. Explanation of Organic EL Device According to Embodiments>

The organic EL device according to the embodiment is premised on the system configuration shown in FIG. 1, which is characterized on the configuration of the write scanning circuit 40 for generating the write scanning signal WS in the system configuration. Specifically, the write scanning circuit 40 according to the embodiment generates the write scanning signal WS determining the threshold correction period and the write scanning signal WS determining the signal writing and mobility correction period by using different power source potentials.

The write scanning signal WS determining the signal writing and mobility correction period is generated based on respective timings of rising and falling of one pulse-state power source potential $Vddws_2$. Accordingly, respective timings of rising and falling of the write scanning signal WS are not affected by variations in transistor characteristics as in the case of generating the write scanning signal WS through the logic circuit. Therefore, the length of the mobility correction period does not vary due to variations in transistor characteristics.

The number of on/off times of the power source $Vddws_2$ may be also the same as in the case of determining the rising timing of the write scanning signal WS by the logic circuit, therefore, power consumption is not increased. As variations in the length of the mobility correction period can be suppressed without incurring the increase of power consumption, luminance unevenness due to variations can be suppressed with low power consumption.

Hereinafter, specific embodiments of the write scanning circuit 40 generating the write scanning signal WS determining the signal writing and mobility correction period based on respective timings of rising and falling of one pulse-state power source potential $Vddws_2$ will be explained.

[2-1. Embodiment 1]

Figure 13:
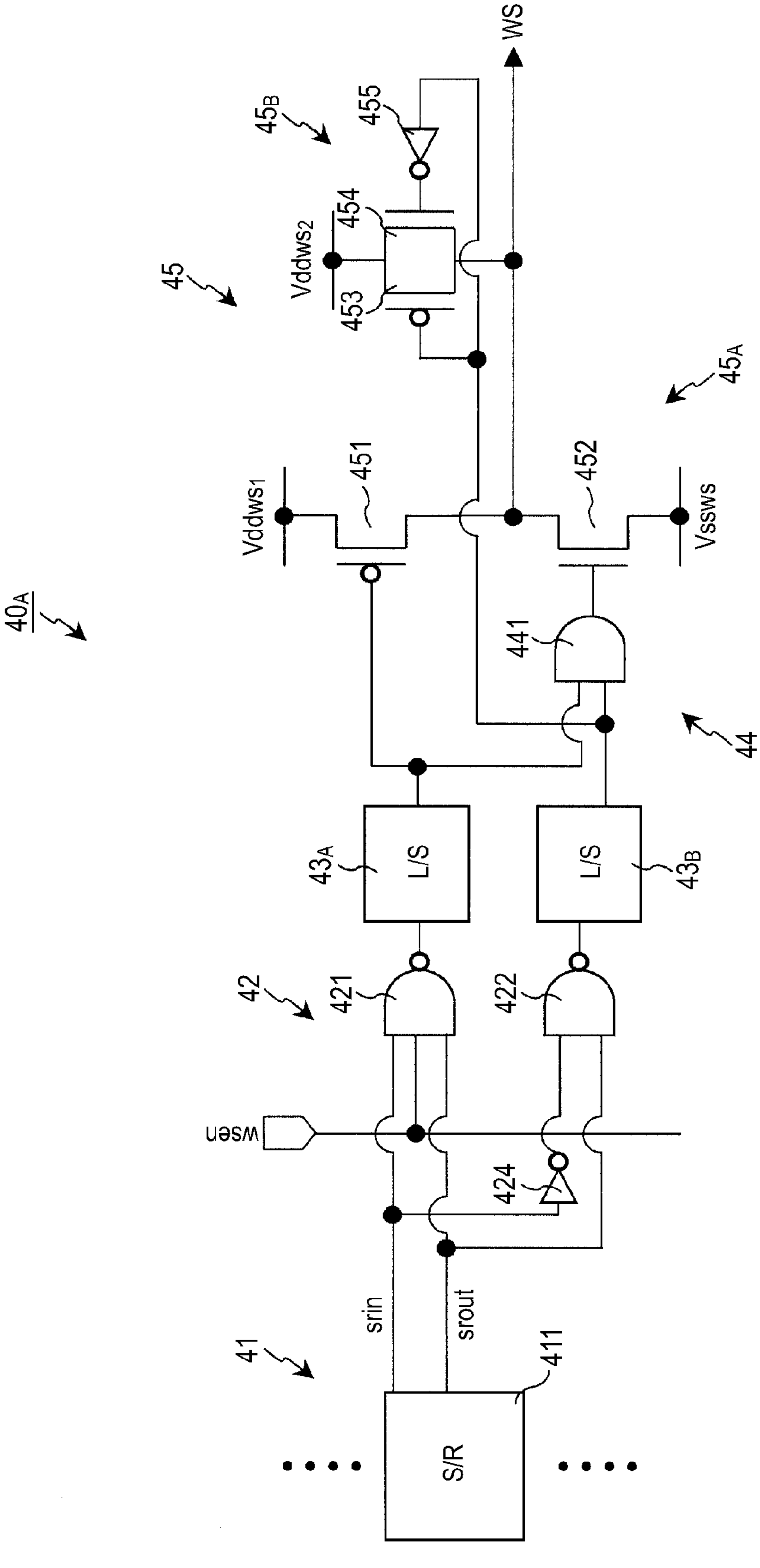
FIG. 13 is a block diagram showing a circuit configuration of the write scanning circuit according to Embodiment 1.

FIG. 13 is a block diagram showing a circuit configuration of the write scanning circuit according to Embodiment 1. In the drawing, the same numerals and signs are given to the same components as FIG. 10. Here, the circuit configuration of one unit circuit corresponding to a given pixel row in the write scanning circuit is shown for simplifying the drawing. Actually, the unit circuits corresponding to the number of rows in the pixel array unit 30 are arranged.

As shown in FIG. 13, a unit circuit $\mathbf{40}_A$ of the write scanning circuit 40 according to the Embodiment 1 includes the shift register 41, the first logic circuit 42, level shift circuits $\mathbf{43}_A$, $\mathbf{43}_B$, the second logic circuit 44 and the buffer circuit 45. The shift register 41 has a configuration in which transfer stages (registers) 411 as unit circuits corresponding to the number of rows in the pixel array unit 30 are connected in cascade.

To the first logic circuit 42, an input pulse "srin" and an output pulse "srout" of each transfer stage 411 are given from the shift register 41. An enable signal wsen is further given to the first logic circuit 42 from the outside. The first logic circuit 42 includes a 3-input NAND circuit 421, a 2-input NAND circuit 422 and the inverter 424.

The NAND circuit 421 has 3-inputs which are the input pulse "srin", the output pulse "srout" given from the transfer stage 411 and the enable signal wsen given from the outside. An output of the NAND circuit 421 is level-shifted in the level shift circuit 43A, then, supplied to the second logic circuit 44 and the buffer circuit 45. The NAND circuit 422 has 2-inputs which are an inversion pulse of the input pulse "srin" obtained through the inverter 424 and the output pulse "srout". An output of the NAND circuit 422 is level-shifted in the level shift circuit 43B, then, supplied to the second logic circuit 44 and the buffer circuit 45.

The second logic circuit 44 includes the AND circuit 441 having 2-inputs which are respective outputs of the level shift circuits $\mathbf{43}_A$, $\mathbf{43}_B$. An output of the second logic circuit 44, namely, the output of the AND circuit 441 is supplied to the buffer circuit 45.

The buffer circuit 45 includes a front-stage circuit unit (first buffer circuit) $\mathbf{45}_A$ using a DC (fixed) power source potential $Vddws_1$ as the positive-side power source potential and a subsequent-stage circuit unit (second buffer circuit) $\mathbf{45}_B$ using the pulse-state power source potential $Vddws_2$ as the positive-side power source potential. Here, the voltage values of the power source potential $Vddws_1$ and the power source potential $Vddws_2$ are assumed to be approximately the same ($=V_2$).

The front-stage circuit unit $\mathbf{45}_A$ has a configuration in which, for example, a p-channel transistor 451 and an N-channel transistor 452 are connected in series between a node of the positive-side power source potential $Vddws_1$ and a node of a negative-side power source potential Vssws. The P-channel transistor 451 has a gate input which is an output of the level shift circuit 43A. The N-channel transistor 452 has a gate input which is an output of the AND circuit 441.

The subsequent-stage circuit unit $\mathbf{45}_B$ has a CMOS transfer-gate configuration in which, for example, a P-channel transistor 453 and an N-channel transistor 454 are connected in parallel between a node of the positive-side power source potential $Vddws_2$ and an output node of the front-stage circuit unit $\mathbf{45}_A$. The output node of the front-stage circuit unit $\mathbf{45}_A$ is a drain-common connection node of the transistors 451, 452, which is the output node of the unit circuit 40A. The P-channel transistor 453 has agate input which is an output of the level shift circuit 43B. The N-channel transistor 454 has a gate input which is an inversion output of the level shift circuit $\mathbf{43}_B$ obtained through an inverter 455.

Figure 14:
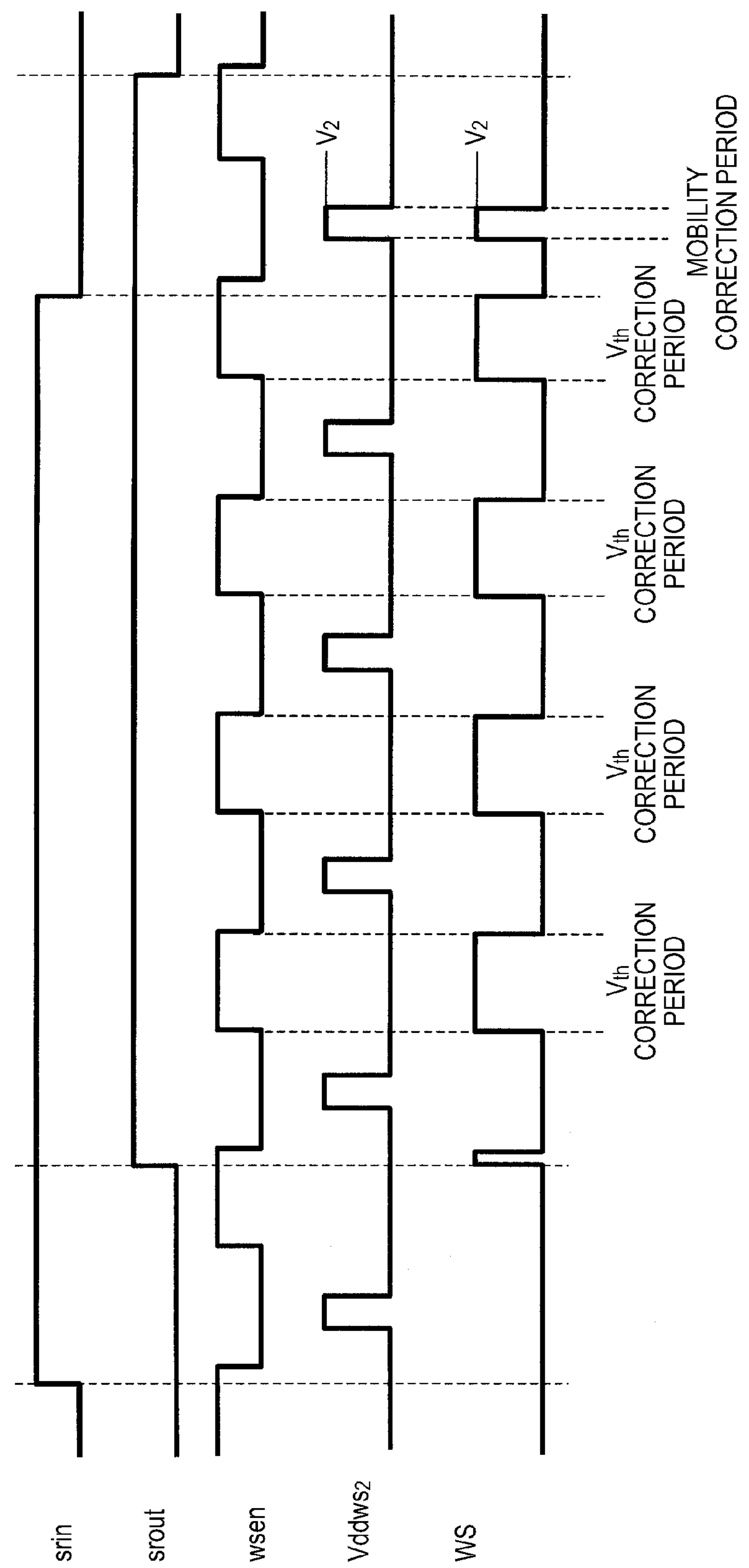
FIG. 14 is a timing waveform chart used for explaining circuit operations of the write scanning circuit according to Embodiment 1.

FIG. 14 shows the timing relation of the input pulse "srin" and the output pulse "srout" of the transfer stage 411, the enable signal swen, the positive-side power source potential $Vddws_2$ and the write scanning signal WS.

The driving method of the divided threshold correction is applied here, and for example, a case in which the threshold correction processing is performed five times in total in the 1 H period and over 4 H periods preceding to the 1 H period in which the threshold correction processing is performed with the mobility correction and signal writing processing is cited as an example.

As apparent from a timing waveform chart of FIG. 14, the P-channel transistor 451 of the buffer circuit 45 becomes conductive at the rising timing of the enable signal wsen, therefore, the write scanning signal WS determining the threshold correction period rises to the positive-side power source potential $Vddws_1$. Additionally, the N-channel transistor 452 of the buffer circuit 45 becomes conductive at the falling timing of the enable signal wsen, therefore, the write scanning signal WS determining the threshold correction period falls to the negative-side power source potential Vssws.

On the other hand, in a period when the input pulse "srin" is in the low level and the output pulse "srout" is in the high level, which are given from each transfer stage 411 of the shift register 41, the CMOS transfer gate as the subsequent-stage circuit unit $\mathbf{45}_B$ of the buffer circuit 45 becomes conductive. Then, in the conductive period of the CMOS transfer gate, when the pulse-state power source potential $Vddsw_2$ rises, the write scanning signal SW rises, and when the power source potential $Vddsw_2$ falls, the write scanning signal SW falls.

The write scanning signal SW generated at this time will be the write scanning signal determining the signal writing and mobility correction period. That is, both of respective timings of rising and falling of the write scanning signal WS determining the signal writing and mobility correction period are determined by respective timings of rising and falling of one pulse-state power source potential $Vddsw_2$.

In the unit circuit $\mathbf{40}_A$ of the write scanning circuit 40 according to the above described Embodiment 1, both of respective timings of rising and falling of the write scanning signal WS determining the mobility correction period are determined by respective timings of rising and falling of one pulse-state power source potential $Vddsw_2$. Therefore, variations in length of the mobility correction period due to variations in transistor characteristics forming the first and second logic circuits 42, 44 do not occur.

The number of on/off times of the pulse-state power source potential $Vddsw_2$ when generating the write scanning signal WS determining the mobility correction period is once, which is the same as in the case of the related art example (refer to FIG. 10), therefore, power consumption is not increased. In addition, the first to third enable signals $wsen_1$ to $wsen_3$ are necessary in the relate art example, however, the same output of the write scanning signal WS can be obtained by one enable signal wsen by the unit circuit $\mathbf{40}_A$ of the write scanning circuit 40 according to Embodiment 1, therefore, power consumption can be further reduced on the circuit operations along with the reduction of pulse number.

[2-2. Embodiment 2]

Subsequently, a circuit configuration of the write scanning circuit according to Embodiment 2 is the same as the circuit configuration of the write scanning circuit according to Embodiment 1. Embodiment 2 applies a configuration in which respective voltage values of two power source potentials $Vddws_1$, $Vddws_2$ are different, which generate two kinds of write scanning signals WS determining respective correction periods which are the threshold correction and the mobility correction.

In the related art example shown in FIG. 10, two kinds of write scanning signals WS determining respective correction periods of the threshold correction and the mobility correction are generated based on the common (single) power source potential $Vddws_2$. Therefore, respective pulse amplitudes of the write scanning signal WS determining the threshold correction period and the write scanning signal WS determining the mobility correction period have to be the same.

On the other hand, when generating the write scanning signal WS in the embodiment (Embodiment 1), the High voltage in the threshold correction period is supplied from one power source potential $Vddws_1$ and the High voltage in the mobility correction period is supplied from the other power source potential $Vddws_2$. That is, the write scanning signal WS determining the threshold correction period and the write scanning signal WS determining the mobility correction period are generated by using different power source potentials.

Accordingly, respective voltage values of the two power source potentials $Vddws_1$, $Vddsw_2$ are made to be different in Embodiment 2. Specifically, when the voltage value of the power source potential $Vddws_2$ for the mobility correction period is $V_2$, the voltage value of the power source potential $Vddws_1$ for the threshold correction period is set to the voltage value $V_1$ which is lower than the voltage value $V_2$.

As apparent from the explanation of the above circuit operations, the threshold correction operation is normally performed by writing the reference voltage $V_{ofs}$ which is lower than the signal voltage $V_{sig}$ during light emission into the gate electrode of the drive transistor 22 in the threshold correction period. Therefore, it is no problem in the circuit operations when the amplitude of the write scanning signal WS applied to the gate electrode of the write transistor 23 during the threshold correction period is smaller than the amplitude of the write scanning signal WS applied to the gate electrode of the write transistor 23 during the mobility correction period.

Figure 15:
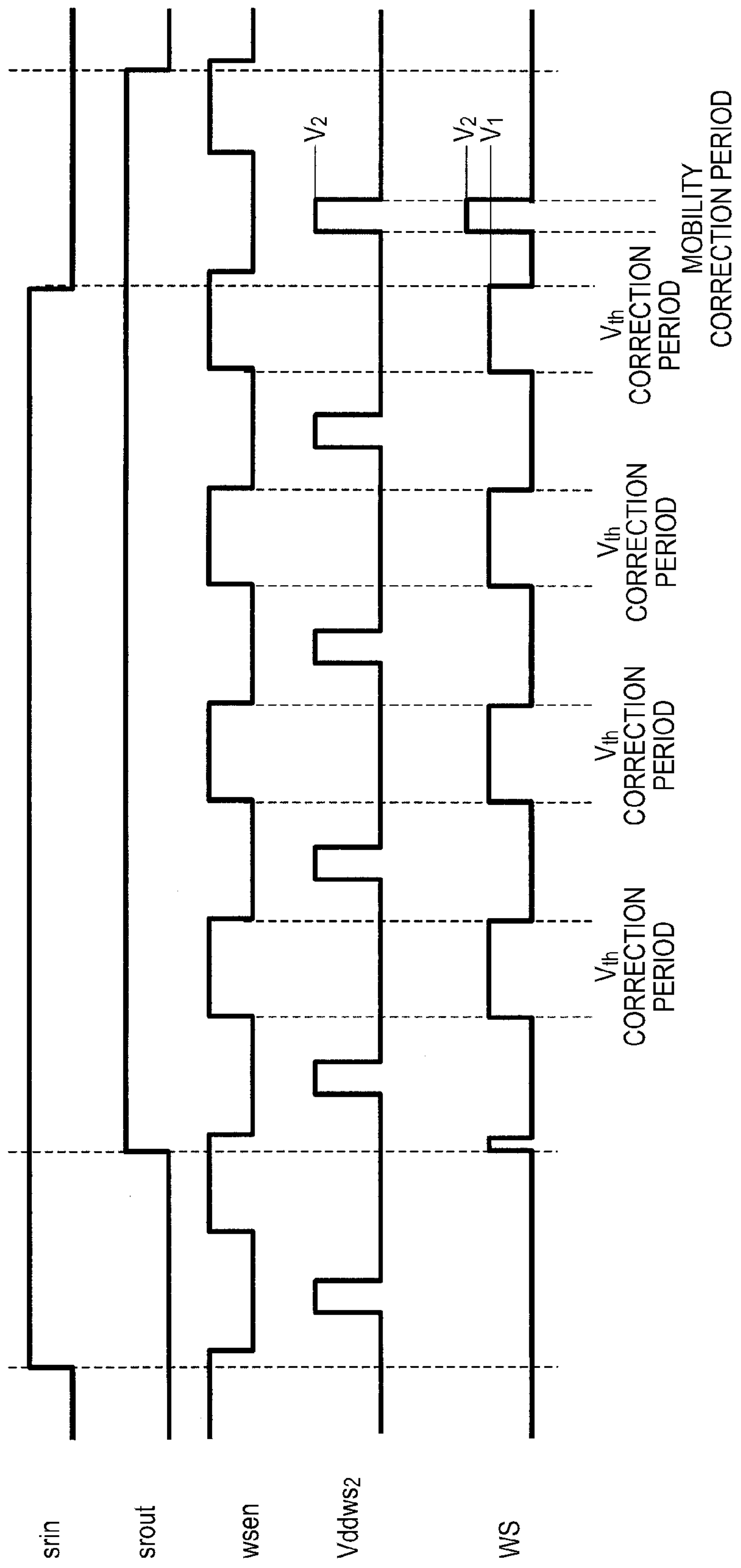
FIG. 15 is a timing waveform chart used for explaining circuit operations of the write scanning circuit according to Embodiment 2.

In view of the above, the amplitude of the write scanning signal WS applied to the gate electrode of the write transistor 23 during the threshold correction period is made to be smaller than the amplitude of the write scanning signal WS applied to the gate electrode of the write scanning transistor 23 during the mobility correction period. Specifically, the voltage value $V_1$ of the power source potential $Vddws_1$ for the threshold correction period is set to a lower voltage than the voltage value $V_2$ of the power source potential $Vddws_2$ for the mobility correction period as shown in a timing waveform chart of FIG. 15.

According to this, electric power consumed during the threshold correction period can be reduced as compared with the case of $V_1=V_2$. Particularly, when applying the driving method of divided threshold correction in which the threshold correction processing is performed in the 1 H period and over plural H periods preceding to the 1 H period in which the threshold correction processing is performed with the mobility correction and signal writing processing, the effect of reducing power consumption in the whole threshold correction period is extremely large due to the increase in the number of times of the threshold correction processing.

<3. Modification Example>

In the above embodiments, the case of the pixel configuration in which the drive circuit of the organic EL device 21 basically includes two transistors which are the drive transistor 22 and the write transistor 23 has been explained by citing examples, however, the invention is not limited to the above pixel configuration. That is, the invention can be applied to various display devices in which pixels have the function of correcting mobility of the drive transistors 22.

Also in the above embodiments, the case in which the invention is applied to the organic EL display device using the organic EL device as the electro-optic device of the pixel has been explained by citing examples, however, the invention is not limited to the application example. Specifically, the invention can be applied to various display devices using current-driven type electro-optic device (light-emitting device) in which light emission luminance varies according to the current value flowing in the device such as an inorganic EL device, an LED device and a semiconductor laser device.

<4. Application Example>

The display device according embodiments of the invention described above can be applied to display devices of electronic apparatus in various fields which display video signals inputted into electronic apparatus or video signals generated in electronic apparatus as images or video. As examples, the invention can be applied to display devices of various electronic apparatus shown in FIG. 16 to FIG. 20G, for example, a digital camera, a notebook personal computer, portable terminal devices such as a cellular phone, a video camera and so on.

The display device according to the embodiments of the invention is used as display devices of electronic apparatus in various field, thereby improving image quality of the display images in various types of electronic apparatus. As apparent from the above explanation of embodiments, the display device according to embodiments of the invention can suppress variations in length of the mobility correction period as well as suppress luminance unevenness due to the variations without incurring increase of power consumption, therefore, uniformity of luminance in display images can be improved whole suppressing the increase of power consumption in various types of electronic apparatus.

The display device according to embodiments of the invention includes a module shape device having a sealed configuration. For example, a display module formed by bonding an opposite portions made of transparent glass and the like to the pixel array unit 30 can be cited. The transparent opposite portion may be provided with color filters, a protection film and the like, and further, a shielding film. The display module may also be provided with a circuit portion, a FPC (flexible print circuit) or the like for inputting/outputting signals to the pixel array unit from the outside.

Hereinafter, specific examples of electronic apparatus to which the invention are applied will be explained.

Figure 16:
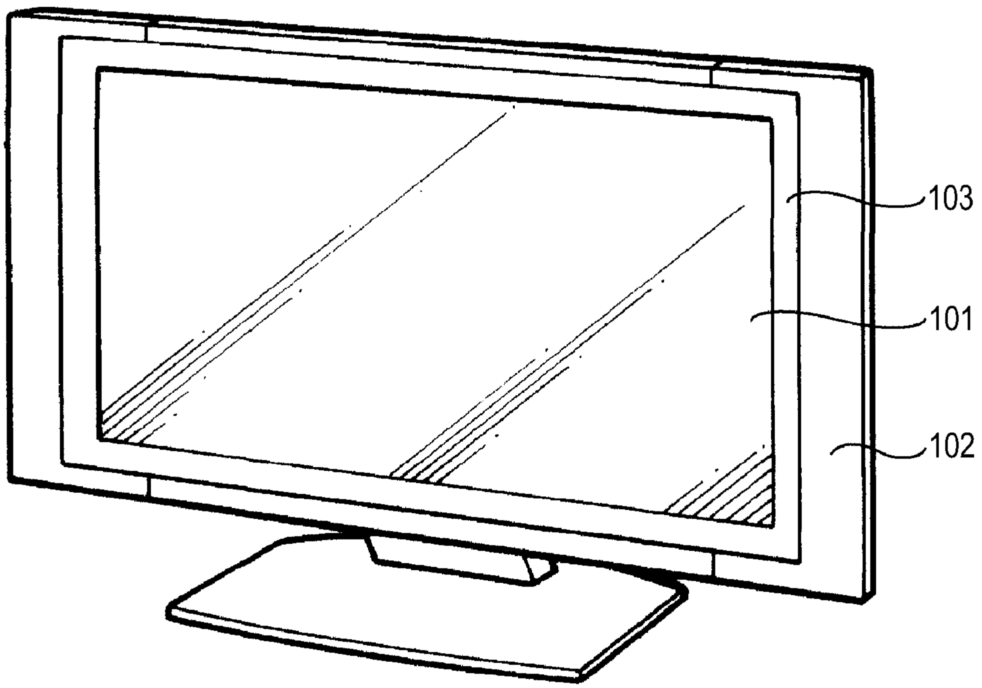
FIG. 16 is a perspective view showing appearance of a television set to which the invention is applied.

FIG. 16 is a perspective view showing appearance of a television set to which the invention is applied. The television set according to the embodiments of the invention includes a video display screen portion 101 having a front panel 102, a filter glass 103 and the like, which is fabricated by using the display device according to the embodiments of the invention as the video display screen unit 101.

Figure 17A:
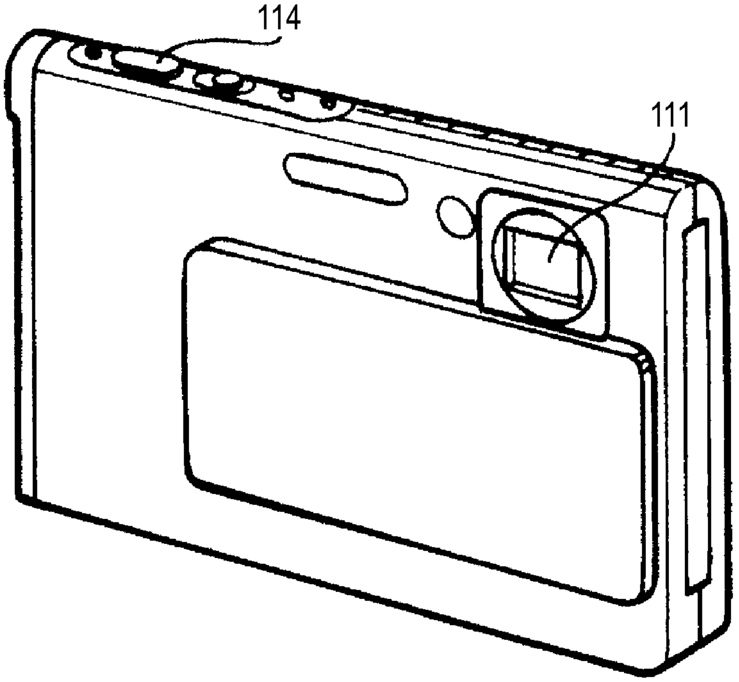
Figure 17B:
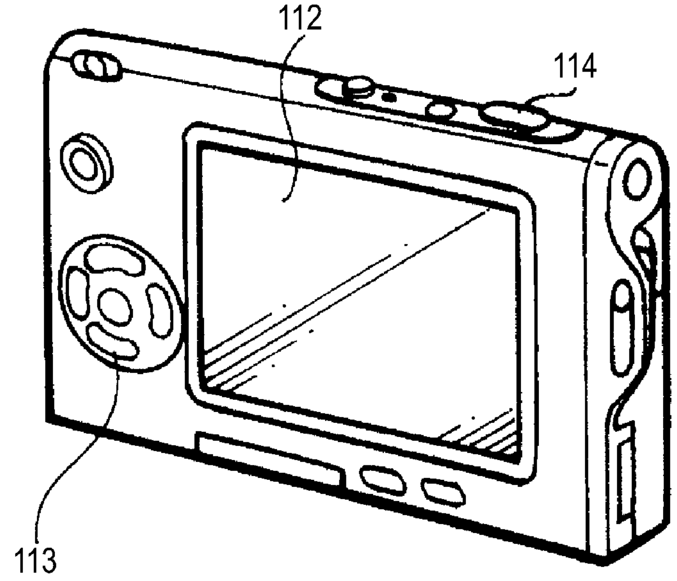

FIGS. 17A, 17B are perspective views showing appearance of a digital camera to which the invention is applied. FIG. 17A is a perspective view seen from the front side and FIG. 17B is a perspective view seen from the reverse side. The digital camera according to the application example includes a light emitting unit 111 for flash, a display unit 112, a menu switch 113, a shutter button 114 and the like, which is fabricated by using the display device according to the embodiments of the invention as the display unit 112.

Figure 18:
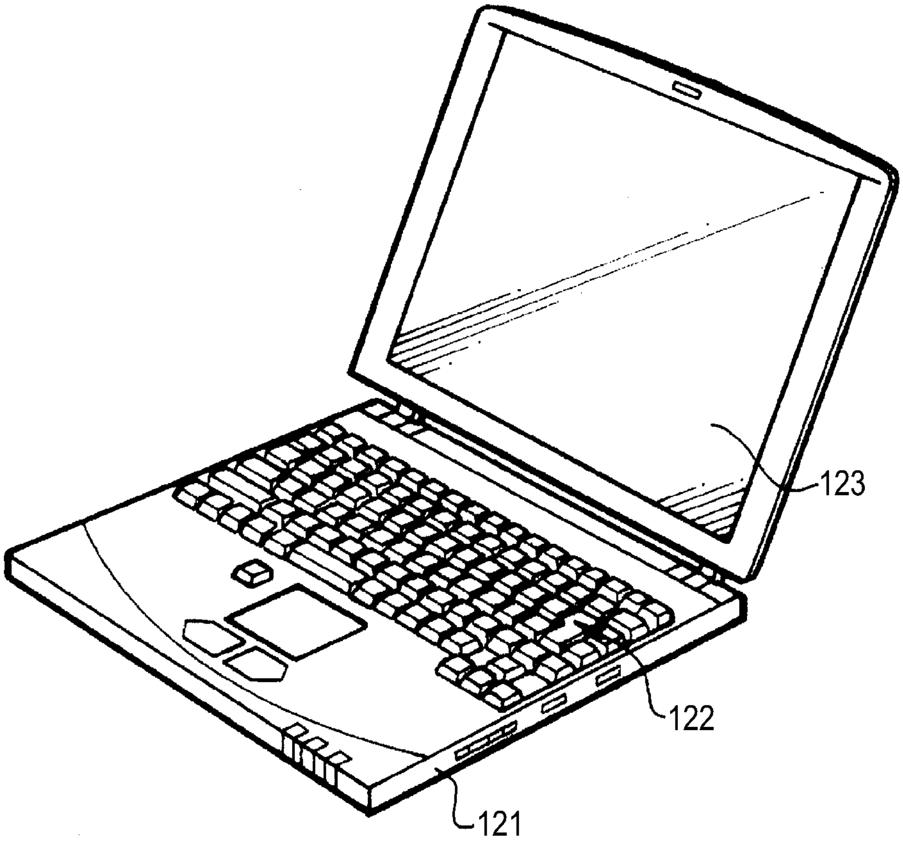
FIG. 18 is a perspective view showing appearance of a notebook personal computer to which the invention is applied.

FIG. 18 is a perspective view showing appearance of a notebook personal computer to which the invention is applied. The notebook personal computer according the application example includes a keyboard 122 operated when inputting characters and so on in a body 121, a display unit 123 displaying images and the like, which is fabricated by using the display device according to the embodiments of the invention as the display unit 123.

Figure 19:
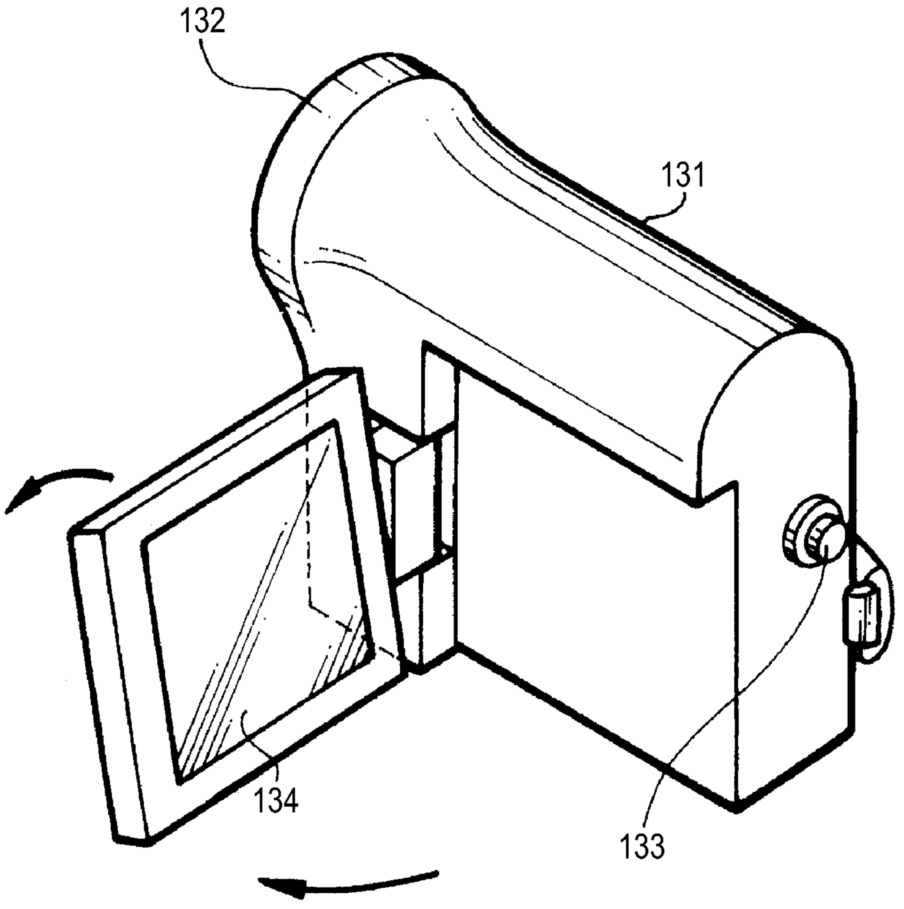
FIG. 19 is a perspective vies showing appearance of a video camera to which the invention is applied.

FIG. 19 is a perspective view showing appearance of a video camera to which the invention is applied. The video camera according to the embodiments of the invention includes a body unit 131, a lens 132 for imaging subjects at a side surface facing the front, a start/stop switch 133 for the time of imaging, a display unit 134 and so on, which is fabricated by using the display device according to the embodiments as the display unit 134.

Figures 20A, 20B, 20C, 20D, 20E, 20F, 20G:
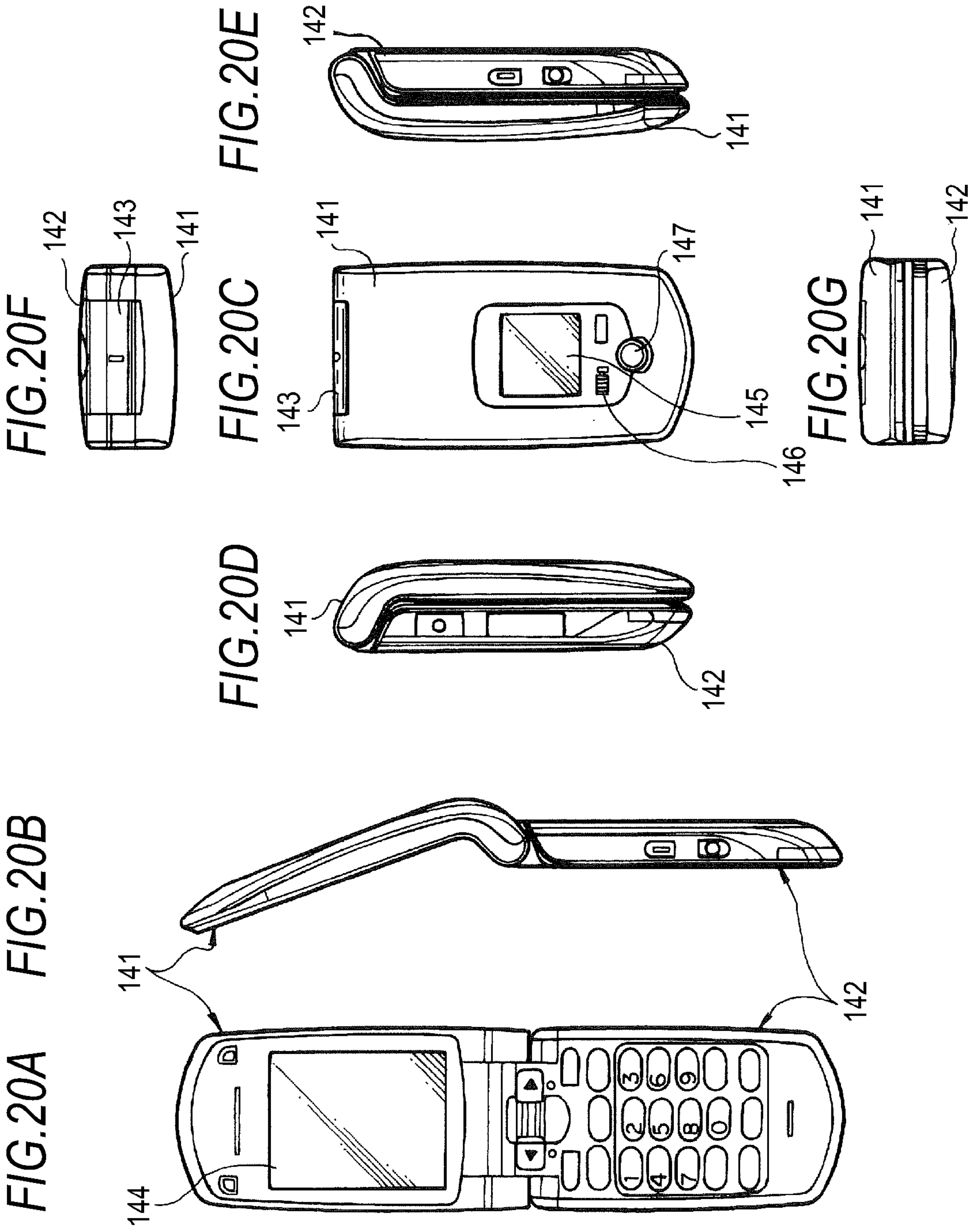

FIGS. 20A to 20G are appearance views showing a portable terminal device, for example, a cellular phone device to which the invention is applied. FIG. 20A is a front view in an opened state, FIG. 20B is a side view thereof, FIG. 20C is a front view in a closed state, FIG. 20D is a left-side view, FIG. 20E is a right-side view, FIG. 20F is an upper surface view and FIG. 20G is a bottom surface view. The cellular phone device according to the embodiment of the invention includes an upper casing 141, a lower casing 142, a connection portion (hinge portion in this case) 143, a display 144, a sub-display 145, a picture light 146, a camera 147 and so on. The cellular phone device according to the application example is fabricated by using the display device according to the embodiments of the invention as the display 144 or the sub-display 145.

The present application contains subject matter related to that disclosed in Japanese Priority Patent Application JP 2010-052729 filed in the Japan Patent Office on Mar. 10, 2010, the entire contents of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. A display device comprising:

a pixel array unit in which plural pixels are arranged, each pixel including an electro-optic device, a write transistor writing a video signal, a storage capacitor storing the video signal written by the write transistor, and a drive transistor driving the electro-optic device based on the video signal stored in the storage capacitor; and a scanning circuit configured to provide a write scanning signal to gate electrodes of the write transistors while sequentially scanning respective pixels in the pixel array row by row, wherein, the write scanning signal is generated based on respective timings of rising and falling of one pulse-state power source potential in a mobility correction period, a mobility correction process which corrects variations in mobility of the drive transistors in respective pixels is performed in parallel to the writing of the video signal by the write scanning signal in the mobility correction period, the pixels have a function of correcting threshold voltage of the drive transistors, and the scanning circuit allows an amplitude of the write scanning signal given to the gate electrode of the write transistor during the correction of threshold voltage to be smaller than an amplitude of the write scanning signal given to the gate electrode of the write transistor during the correction of mobility.

2. The display device according to claim 1, wherein the correction of mobility is performed in accordance with magnitude of electric current flowing in the drive transistor during a conductive period of the write transistor.

3. The display device according to claim 2, wherein the correction of mobility is performed by giving negative feedback to the difference of potentials between gate/source of the drive transistor with a correction amount corresponding to the magnitude of electric current flowing in the drive transistor during the conductive period of the write transistor.

4. The display device according to claim 1, wherein the correction of threshold voltage is performed by changing a source potential of the drive transistor toward a potential obtained by subtracting the threshold voltage of the drive transistor from a reference potential based on an initialization potential of the gate potential of the drive transistor during the conductive period of the write transistor.

5. The display device according to claim 1, wherein:

the scanning circuit includes a first buffer circuit outputting the write scanning signal to the gate electrode of the write transistor during the correction of threshold voltage, and a second buffer circuit outputting the write scanning signal to the gate electrode of the write transistor during the correction of mobility, the first buffer circuit operates by a DC power source potential, and the second buffer circuit operates by the pulse-state power source potential having a higher voltage value than the DC power source potential.

6. The display device according to claim 1, wherein the correction of threshold voltage is performed in one horizontal period in which writing of the video signal is performed by the write transistor and plural times over plural horizontal periods preceding to the one horizontal period.

7. A driving method of a display device including (a) a pixel array unit in which plural pixels are arranged, each pixel including (i) an electro-optic device, (ii) a write transistor writing a video signal, (iii) a storage capacitor storing the video signal written by the write transistor, and (iv) a drive transistor driving the electro-optic device based on the video signal stored in the storage capacitor, the method comprising the step of:

generating a write scanning signal given to gate electrodes of the write transistors while sequentially scanning respective pixels in the pixel array row by row, wherein, the write scanning signal is generated based on respective timings of rising and falling of one pulse-state power source potential in a mobility correction period, a mobility correction process which corrects variations in mobility of the drive transistors in respective pixels is performed in parallel to the writing of the video signal by the write scanning signal in the mobility correction period the pixels have a function of correcting threshold voltage of the drive transistors, and the scanning circuit allows an amplitude of the write scanning signal given to the gate electrode of the write transistor during the correction of threshold voltage to be smaller than an amplitude of the write scanning signal given to the gate electrode of the write transistor during the correction of mobility.

8. An electronic apparatus comprising:

a display device including a pixel array unit in which plural pixels are arranged, each pixel including an electro-optic device, a write transistor writing a video signal, a storage capacitor storing the video signal written by the write transistor and a drive transistor driving the electro-optic device based on the video signal stored in the storage capacitor, and a scanning circuit configured to provide a write scanning signal to gate electrodes of the write transistors while sequentially scanning respective pixels in the pixel array row by row, wherein, the write scanning signal is generated based on respective timings of rising and falling of one pulse-state power source potential in a mobility correction period, a mobility correction process which corrects variations in mobility of the drive transistors in respective pixels is performed in parallel to the writing of the video signal by the write scanning signal in the mobility correction period, the pixels have a function of correcting threshold voltage of the drive transistors, and the scanning circuit allows an amplitude of the write scanning signal given to the gate electrode of the write transistor during the correction of threshold voltage to be smaller than an amplitude of the write scanning signal given to the gate electrode of the write transistor during the correction of mobility.

* * * * *